Sept. 3, 1935. H. R. BRAND Re. 19,685

FOOD PREPARING AND DELIVERY MACHINE

Original Filed April 9, 1928 23 Sheets-Sheet 1

INVENTOR
H. R. Brand
BY
A. Russell Bond
ATTORNEY

Sept. 3, 1935. H. R. BRAND Re. 19,685

FOOD PREPARING AND DELIVERY MACHINE

Original Filed April 9, 1928 23 Sheets-Sheet 2

INVENTOR
H. R. Brand
BY H. Russell Bond
ATTORNEY

Sept. 3, 1935. H. R. BRAND Re. 19,685

FOOD PREPARING AND DELIVERY MACHINE

Original Filed April 9, 1928 23 Sheets-Sheet 3

INVENTOR
H. R. Brand
BY A. Russell Bond
ATTORNEY

Sept. 3, 1935. H. R. BRAND Re. 19,685

FOOD PREPARING AND DELIVERY MACHINE

Original Filed April 9, 1928 23 Sheets-Sheet 4

INVENTOR
H.R. Brand
BY H. Russell Bond
ATTORNEY

Sept. 3, 1935. H. R. BRAND Re. 19,685

FOOD PREPARING AND DELIVERY MACHINE

Original Filed April 9, 1928 23 Sheets-Sheet 5

INVENTOR
H. R. Brand
BY
ATTORNEY

Sept. 3, 1935. H. R. BRAND Re. 19,685

FOOD PREPARING AND DELIVERY MACHINE

Original Filed April 9, 1928 23 Sheets-Sheet 6

INVENTOR
H. R. Brand
BY H. Russell Bond
ATTORNEY

FOOD PREPARING AND DELIVERY MACHINE

Original Filed April 9, 1928 23 Sheets-Sheet 7

INVENTOR
H. R. Brand
BY
ATTORNEY

Sept. 3, 1935. H. R. BRAND Re. 19,685
FOOD PREPARING AND DELIVERY MACHINE
Original Filed April 9, 1928 23 Sheets-Sheet 8
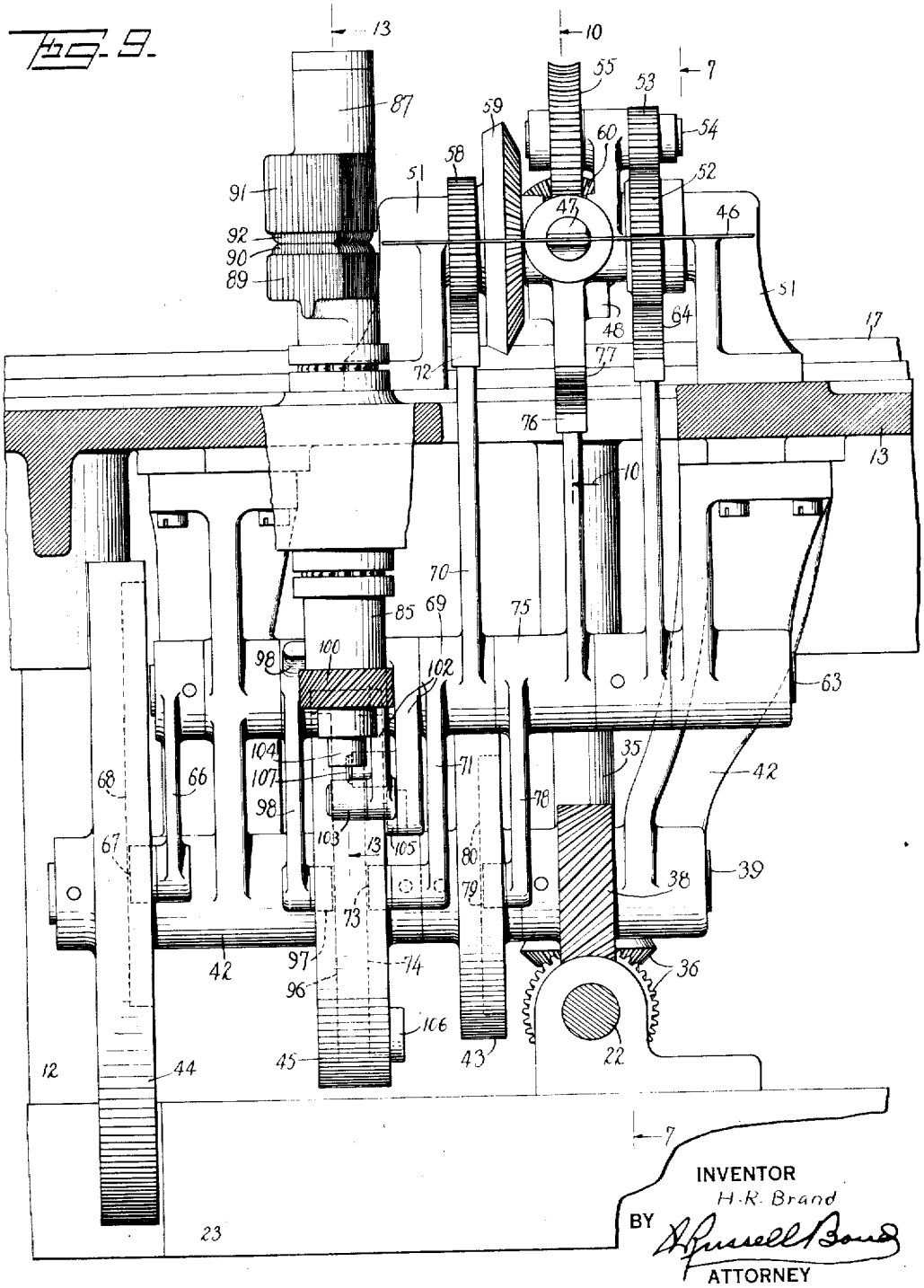
INVENTOR
H. R. Brand
BY
H. Russell Bond
ATTORNEY FOOD PREPARING AND DELIVERY MACHINE
Original Filed April 9, 1928 23 Sheets-Sheet 9
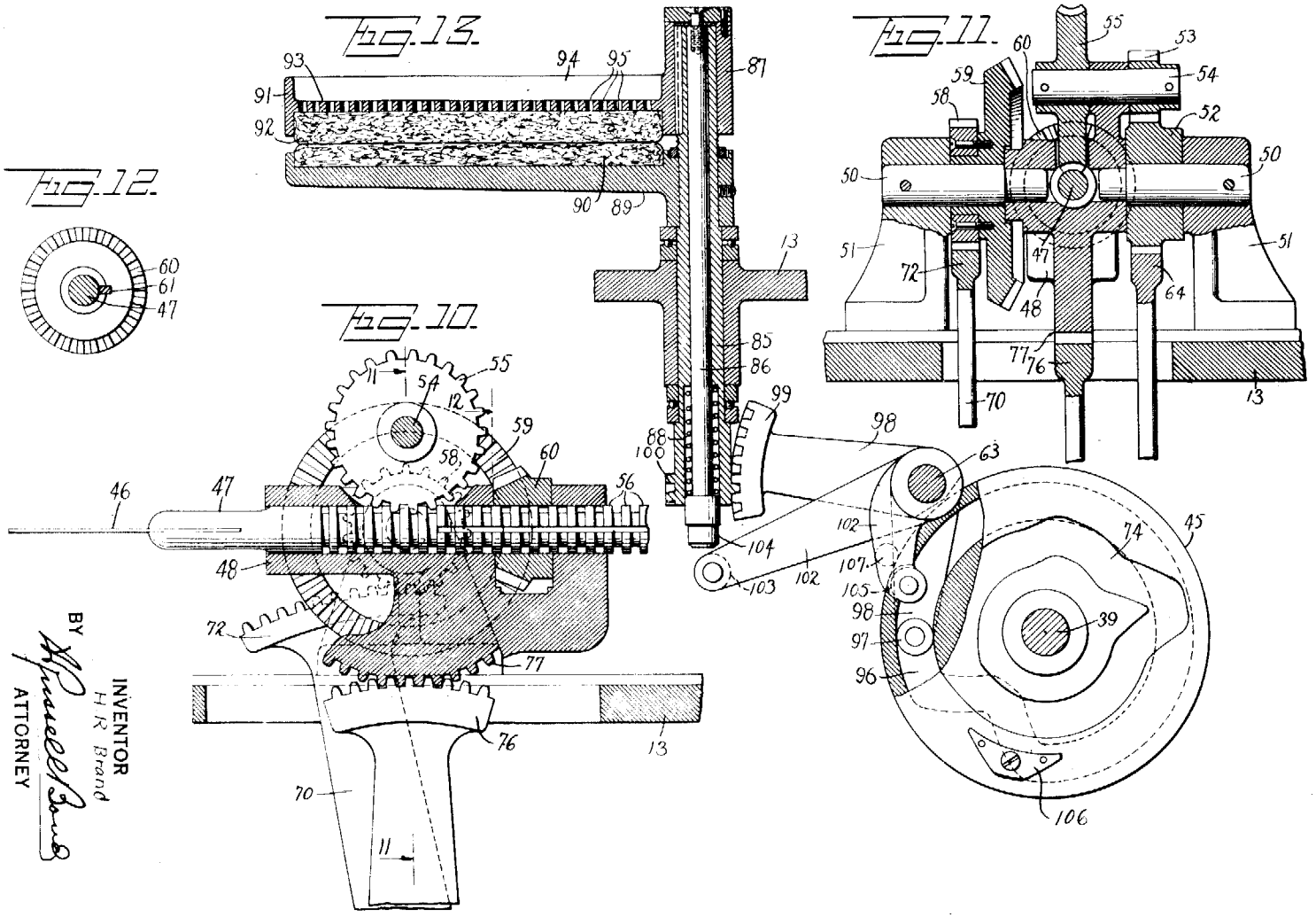
INVENTOR
H R Brand
BY H Russell Bond
ATTORNEY FOOD PREPARING AND DELIVERY MACHINE
Original Filed April 9, 1928 23 Sheets-Sheet 10
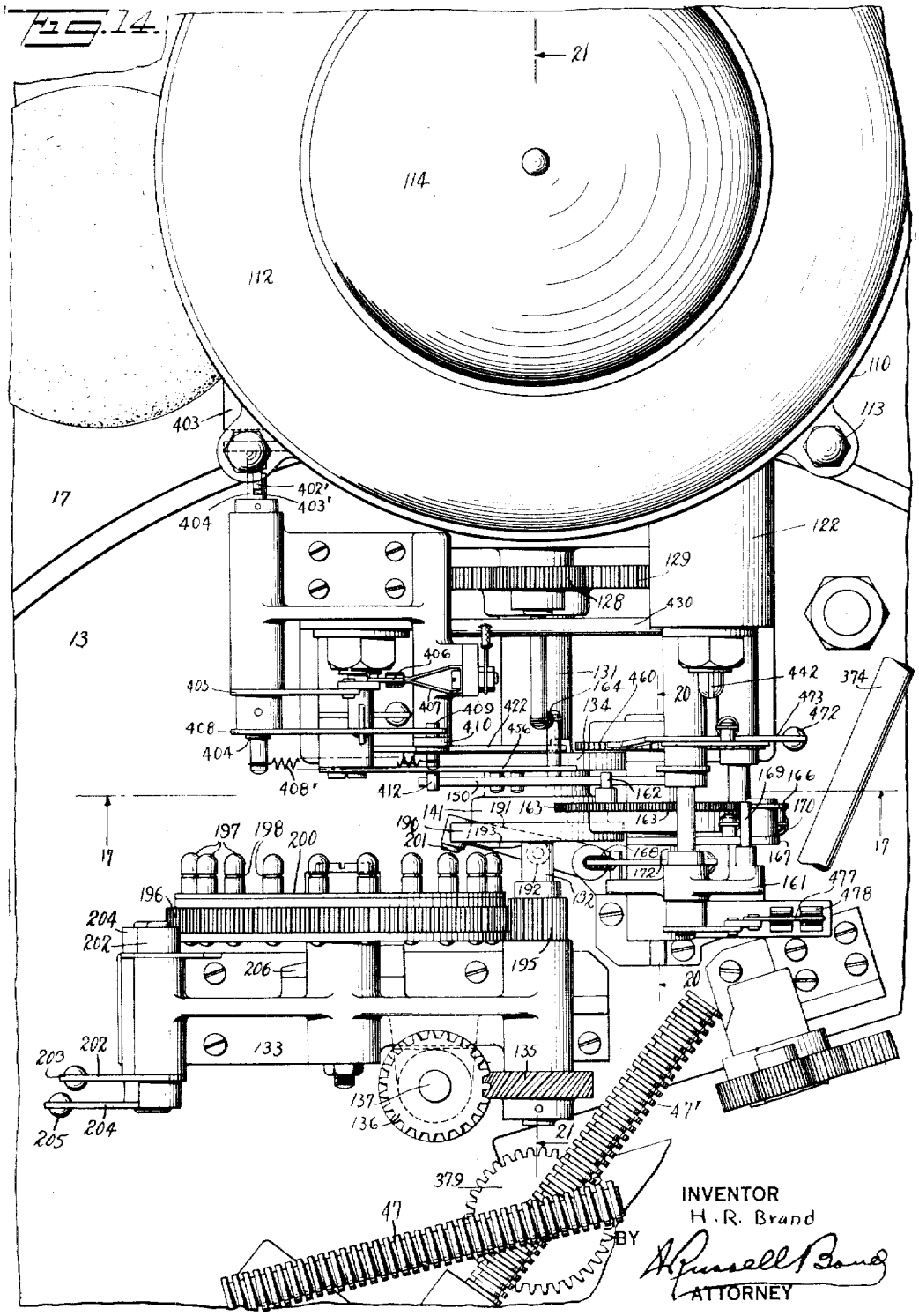

FOOD PREPARING AND DELIVERY MACHINE

Original Filed April 9, 1928 23 Sheets-Sheet 11

INVENTOR
H. R. Brand
BY H. Russell Bond
ATTORNEY

FOOD PREPARING AND DELIVERY MACHINE

Original Filed April 9, 1928 23 Sheets-Sheet 12

INVENTOR
H. R. Brand
BY
H. Russell Bond
ATTORNEY

Sept. 3, 1935. H. R. BRAND Re. 19,685
FOOD PREPARING AND DELIVERY MACHINE
Original Filed April 9, 1928 23 Sheets-Sheet 13
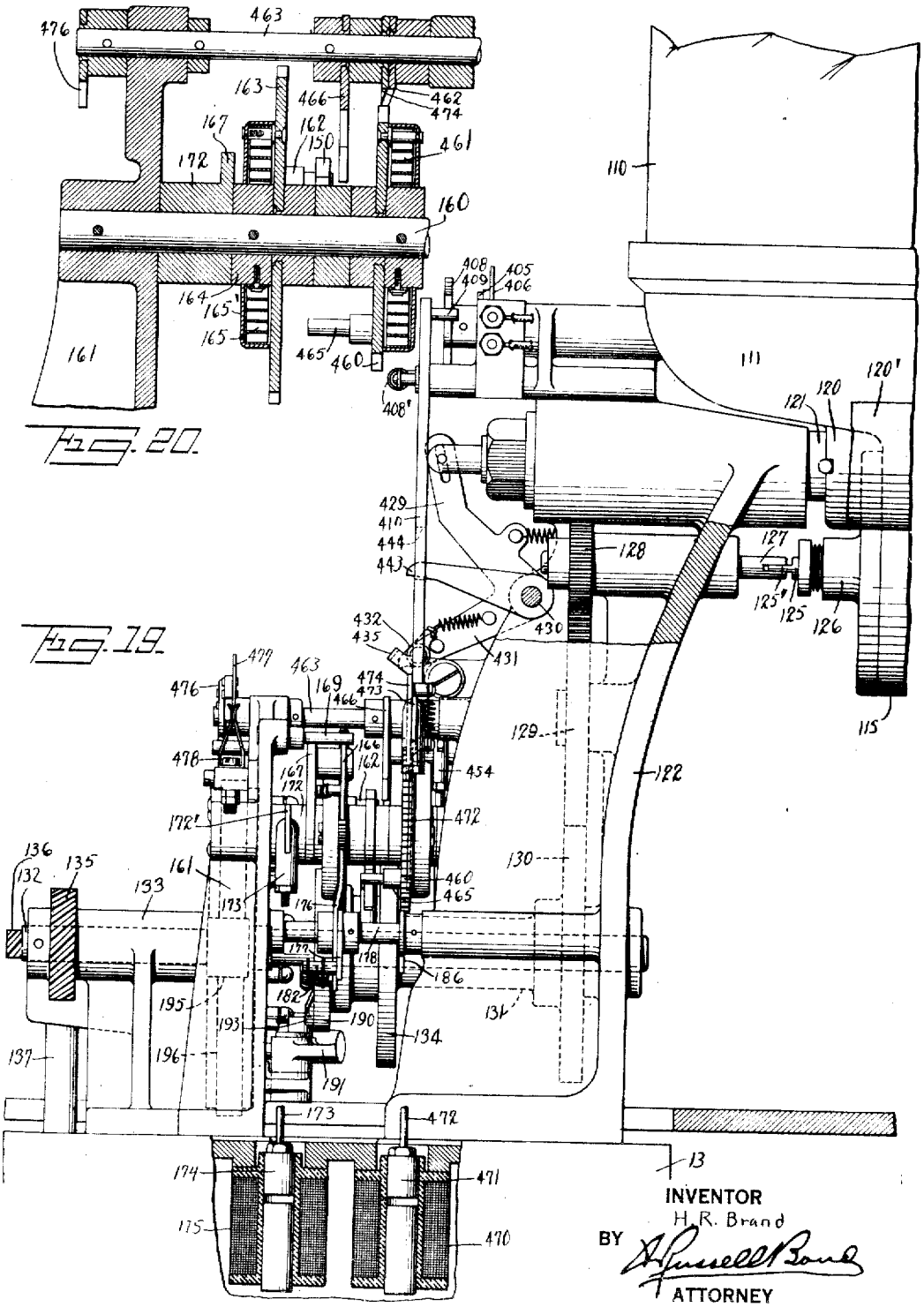

FOOD PREPARING AND DELIVERY MACHINE
Original Filed April 9, 1928 23 Sheets-Sheet 14
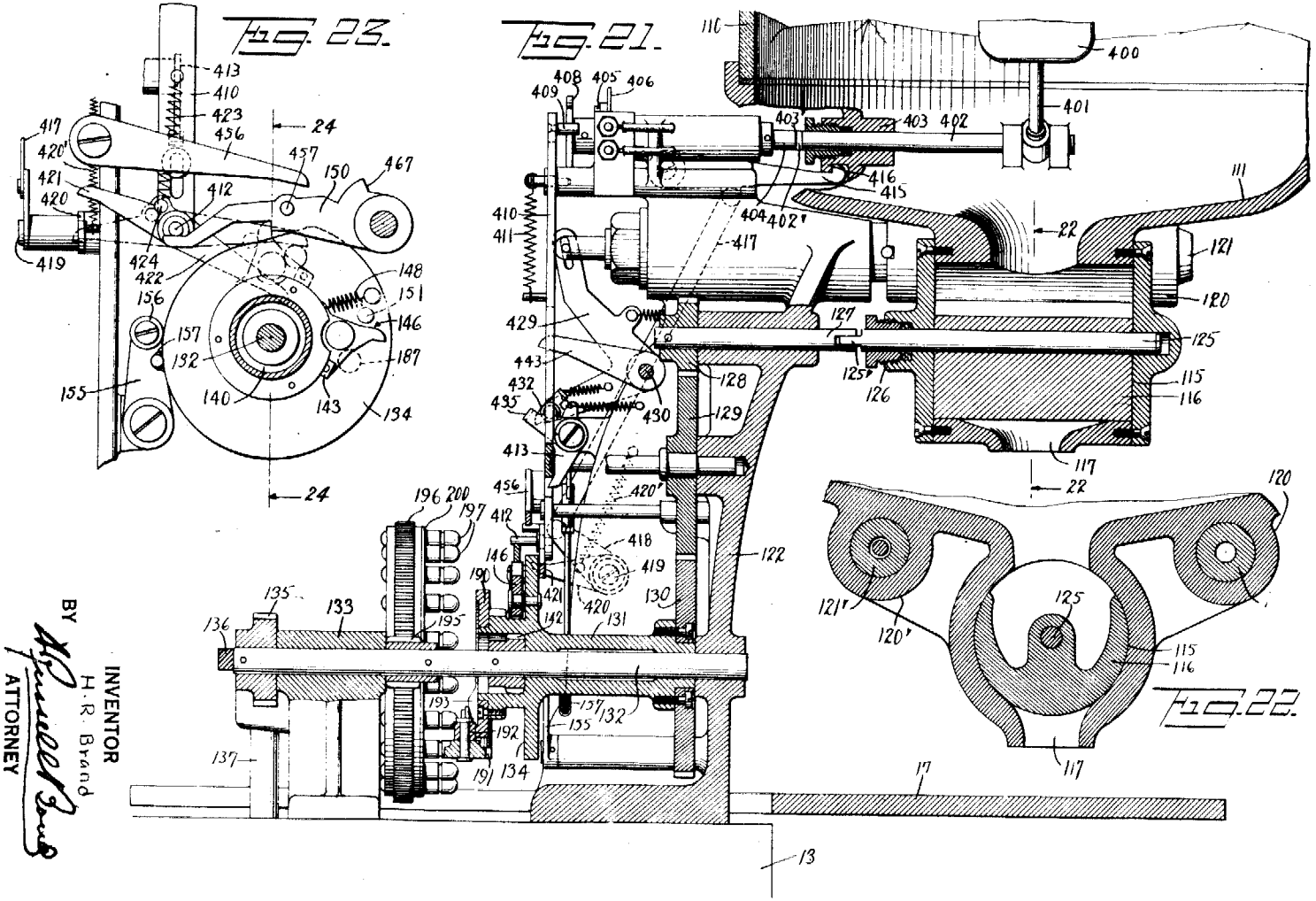
INVENTOR
H. R. Brand
BY
ATTORNEY

FOOD PREPARING AND DELIVERY MACHINE

Original Filed April 9, 1928 23 Sheets-Sheet 15

INVENTOR
H. R. Brand
BY H. Russell Bond
ATTORNEY

FOOD PREPARING AND DELIVERY MACHINE

Original Filed April 9, 1928 23 Sheets-Sheet 16

INVENTOR
H. R. Brand
BY
Russell Bowie
ATTORNEY

FOOD PREPARING AND DELIVERY MACHINE

Original Filed April 9, 1928 23 Sheets-Sheet 17

INVENTOR
H. R. Brand
BY A. Russell Bond
ATTORNEY

FOOD PREPARING AND DELIVERY MACHINE
Original Filed April 9, 1928 23 Sheets-Sheet 18
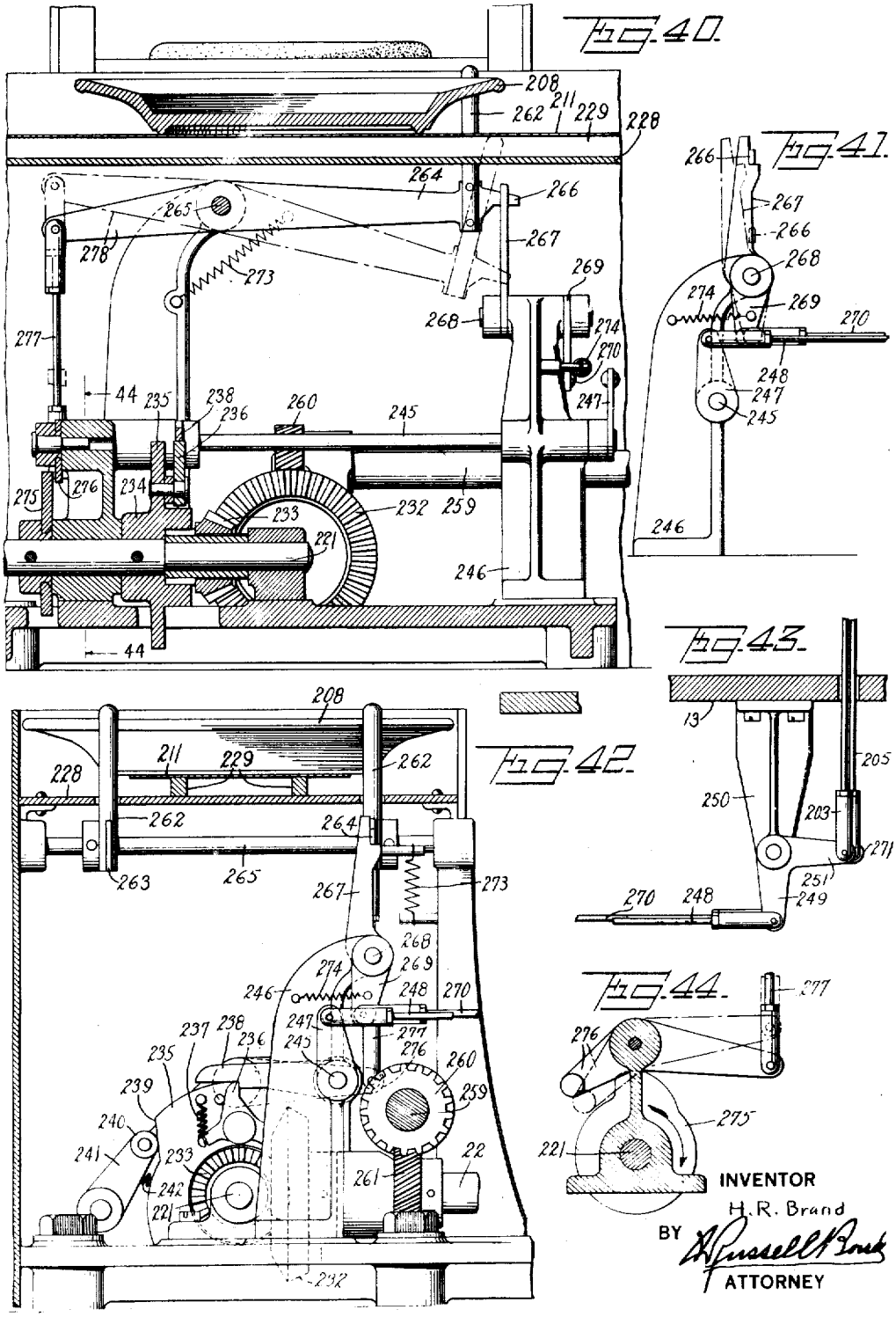

FOOD PREPARING AND DELIVERY MACHINE
Original Filed April 9, 1928 23 Sheets-Sheet 19
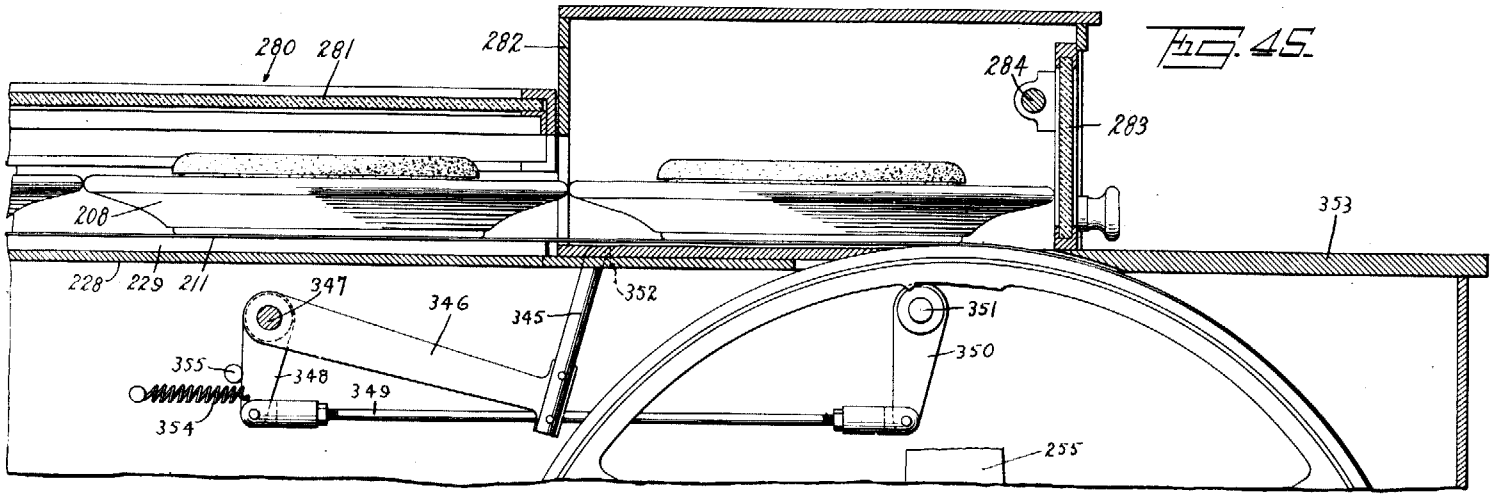
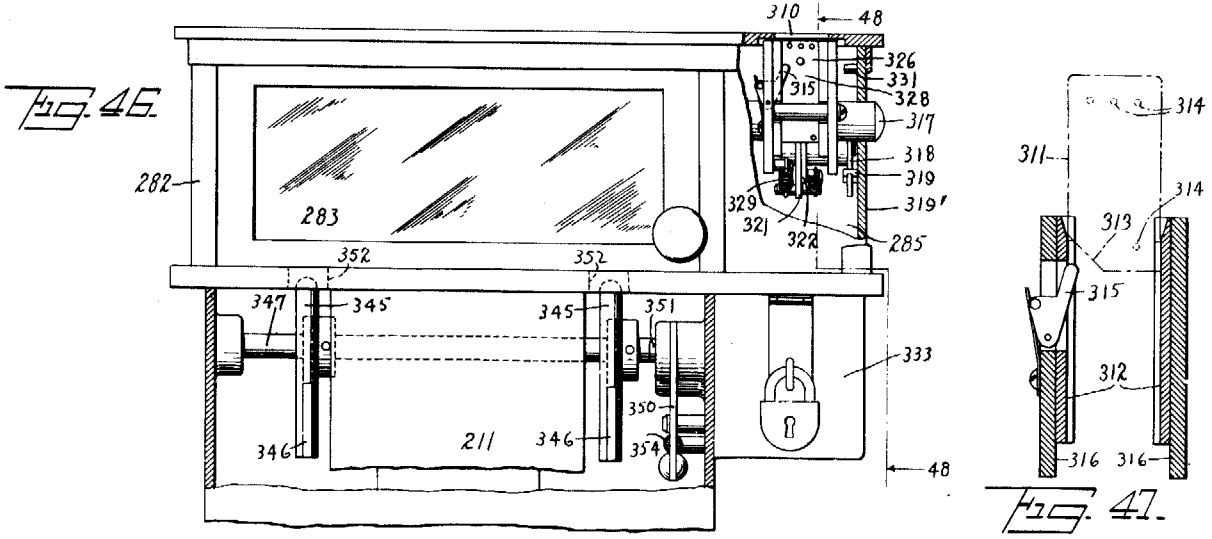
INVENTOR
H. R. Brand
BY
H. Russell Bond
ATTORNEY FOOD PREPARING AND DELIVERY MACHINE
Original Filed April 9. 1928 23 Sheets-Sheet 20
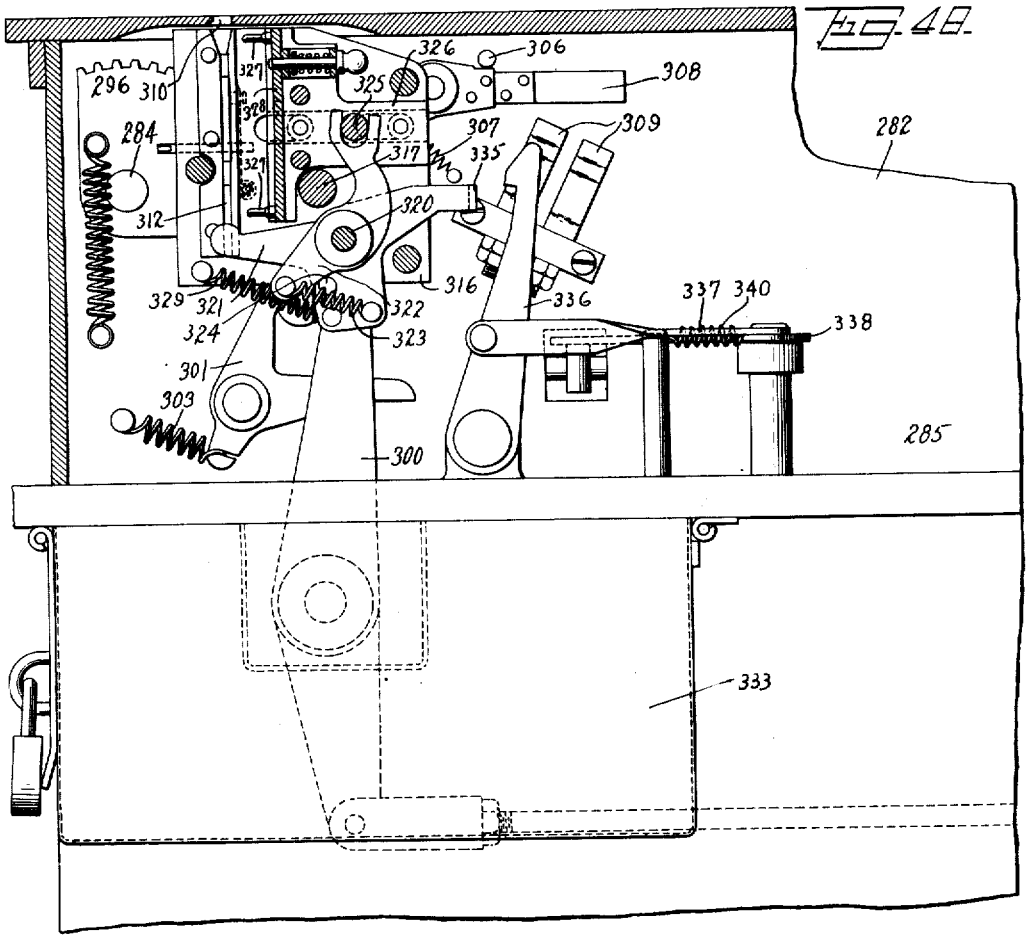
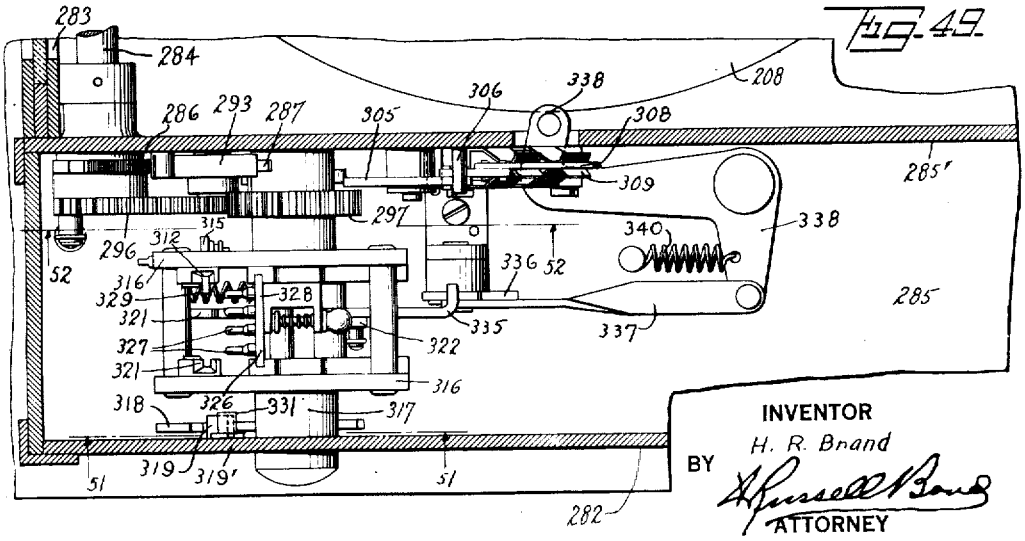
INVENTOR
H. R. Brand
BY
ATTORNEY

FOOD PREPARING AND DELIVERY MACHINE

Original Filed April 9, 1928 23 Sheets-Sheet 21

INVENTOR
H. R. Brand
BY
H. Russell Brand
ATTORNEY

FOOD PREPARING AND DELIVERY MACHINE

Original Filed April 9, 1928 23 Sheets-Sheet 22

INVENTOR
H. R. Brand
BY H. Russell Bond
ATTORNEY

Sept. 3, 1935. H. R. BRAND Re. 19,685

FOOD PREPARING AND DELIVERY MACHINE

Original Filed April 9, 1928 23 Sheets-Sheet 23

INVENTOR
H. R. Brand
BY H. Russell Bond
ATTORNEY

UNITED STATES PATENT OFFICE 19,685

FOOD PREPARING AND DELIVERY MACHINE

Harry Russell Brand, Forest Hills, N. Y., assignor to H. Russell Brand Patent Holding Corporation, New York, N. Y., a corporation of Delaware Original No. 1,848,104, dated March 8, 1932, Serial No. 268,659, April 9, 1928. Application for reissue August 7, 1933, Serial No. 684,081

47 Claims. (Cl. 107—4)

My invention relates to machinery for preparing food and particularly to automatic machinery for preparing and delivering the food on order.

Another object of the invention is to provide a food preparing machine which may be actuated from a distance, filling the orders in sequence at a predetermined rate, such orders as cannot be immediately filled being automatically held back and filled in turn.

Another object of the invention is to provide a food preparing machine with a delivery box into which the orders are automatically delivered and from which they can be removed only by the insertion of a token.

Another object of the invention is to provide means for suspending operation of the machine when the supply of raw material runs below a certain minimum and also when the supply of plates, or receptacles for the finished product, runs below a certain number.

Another object of the invention is to provide a food preparing machine which will be stopped automatically when due to delays in removing the orders from the delivery box, there is too great an accumulation of orders on the conveyor.

Another object of the invention is to provide a machine in which the delivery box cannot be opened when there is no food therein.

A specific object of my invention is to provide a machine for automatically baking griddle cakes on order, depositing each order of cakes on a plate and automatically conveying the plate with its order of cakes to a predetermined point.

Another object of the invention is to provide a cake-baking machine in which the batter reservoir cannot be removed without locking the machine and in which installation or replacement of the batter reservoir will automatically unlock the machine.

With these and other objects in view which will appear hereinafter, I shall now describe a preferred embodiment of my invention and will thereafter define the novelty and scope of the invention in the claims.

In the accompanying drawings;

Fig. 9 is a view in vertical section taken on line 9—9 of Fig. 7;

Fig. 10 is a view in vertical section taken on the line 10—10 of Fig. 9;

Fig. 11 is a view in vertical section taken on the line 11—11 of Fig. 10;

Fig. 12 is a view in transverse section taken on the line 12—12 of Fig. 10;

Fig. 13 is a view in section of the cake-turner greasing mechanism the section being taken on the line 13—13 of Fig. 9;

Fig. 14 is a top plan view of a portion of the machine with part of the casing removed, showing the batter reservoir and certain mechanism associated therewith;

Fig. 19 is an end elevation, partly in section, of the mechanism employed in connection with the batter reservoir, showing the parts as viewed from the right hand side of Fig. 17;

Fig. 20 is a view in section taken on the line 20—20 of Fig. 14;

Fig. 21 is a view in section taken on the line 21—21 of Fig. 14;

Fig. 22 is a view in section taken on the line 22—22 of Fig. 21;

Fig. 23 is a detail of view illustrating a clutch mechanism employed in connection with the batter feed;

Fig. 40 is a view in section illustrating a stop mechanism for holding the plate in position to receive the cakes from the griddle, the section being taken on the line 40—40 of Fig. 5;

Fig. 41 illustrates certain details as viewed from the right hand side of said Fig. 40;

Fig. 42 is a view section taken on the line 42—42 of Fig. 4;

Fig. 43 is a detail view of certain connections employed in the plate controlling mechanism;

Fig. 44 is a view in section taken on the line 44—44 of Fig. 40;

Fig. 45 is a view showing the right hand end of Fig. 4 on an enlarged scale and illustrating certain stop mechanism for preventing a plate from entering the delivery box;

Fig. 46 is an end view of the delivery box with associated parts partly broken away;

Fig. 47 is a detail view of a token receiver;

Fig. 48 is view in section taken on the line 48—48 of Fig. 46 and showing the token receiver mechanism;

Fig. 49 is a plan view of the token receiver with the casing thereof cut away to reveal interior details;

In general my machine comprises an annular griddle A (Figs. 1 and 2) which turns with a step by step motion; a batter reservoir B located at one side of the griddle and adapted to deliver batter to the griddle in response to certain control mechanism; cake turning mechanism largely located within the annular griddle and operating two turners, one at T1 to turn each cake on the griddle as soon as it has been baked sufficiently on one side and present the other side to the griddle, and the other at T2 to lift the finished cake off the griddle and deliver it to a plate; plate supplying mechanism C for delivering plates one at a time into position to receive the finished cakes; and a plate conveyor D for conveying the plates of cakes to a delivery box E which box may be opened upon depositing a suitable token in a token receiver F.

*Griddle mechanism*

Figure 3:
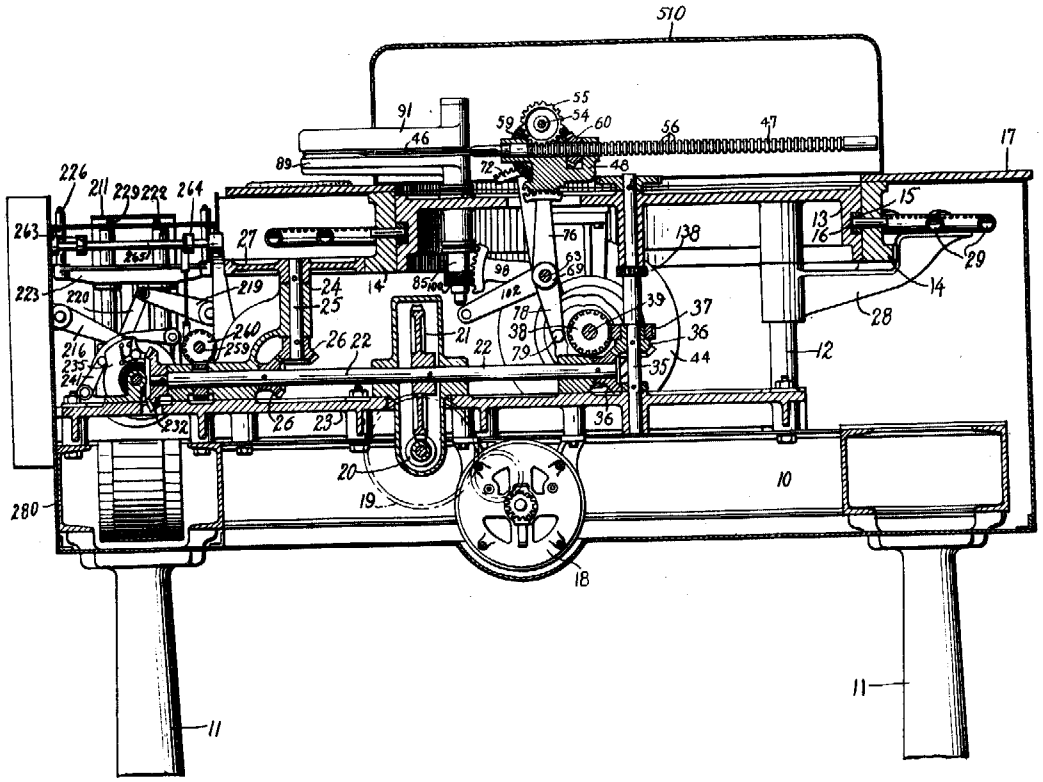
Fig. 3 is a view in vertical section taken on the line 3—3 of Fig. 1.
Figure 6:
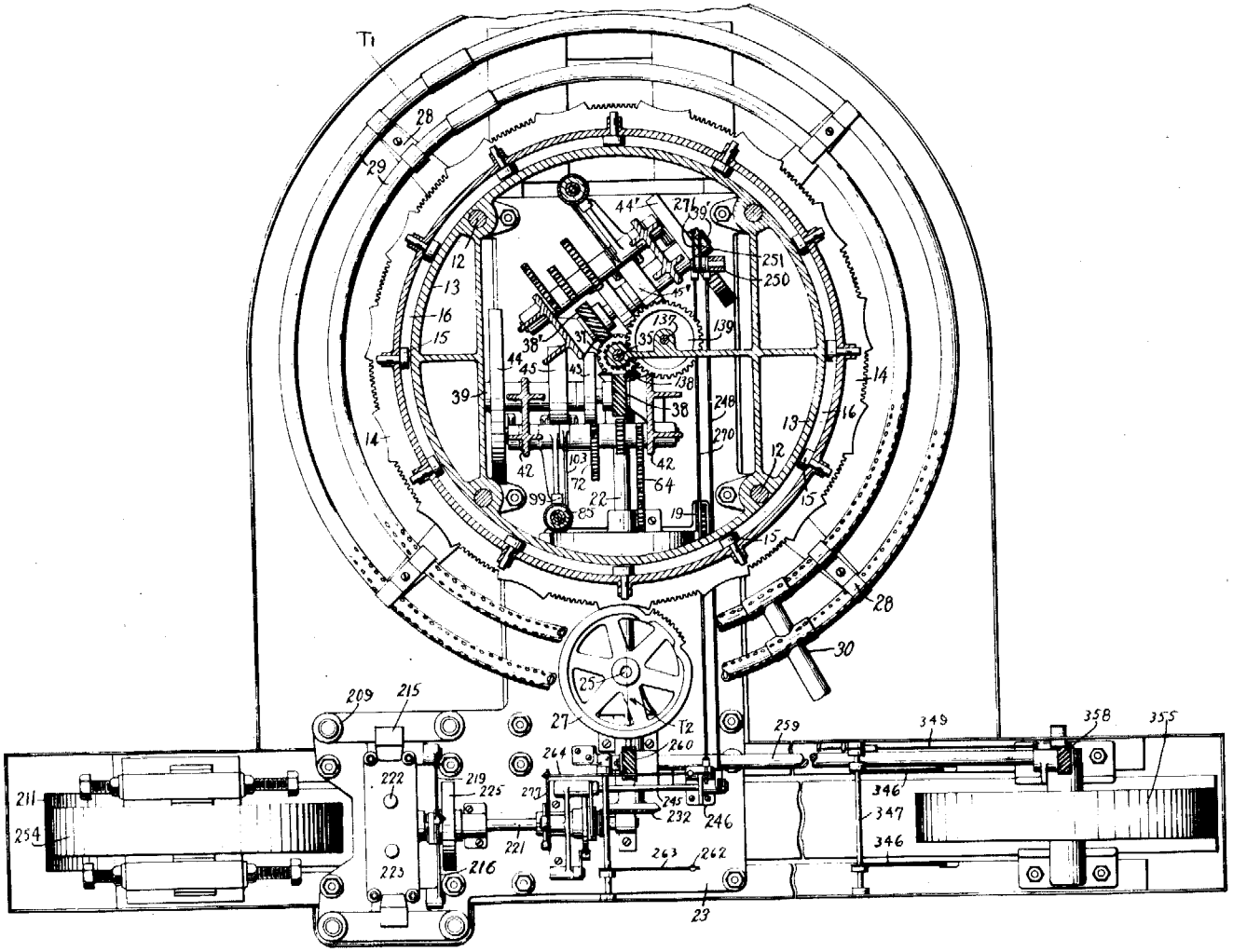
Fig. 6 is a view in horizontal section taken substantially on the line 6—6 of Fig. 4.
Figures 7, 8:
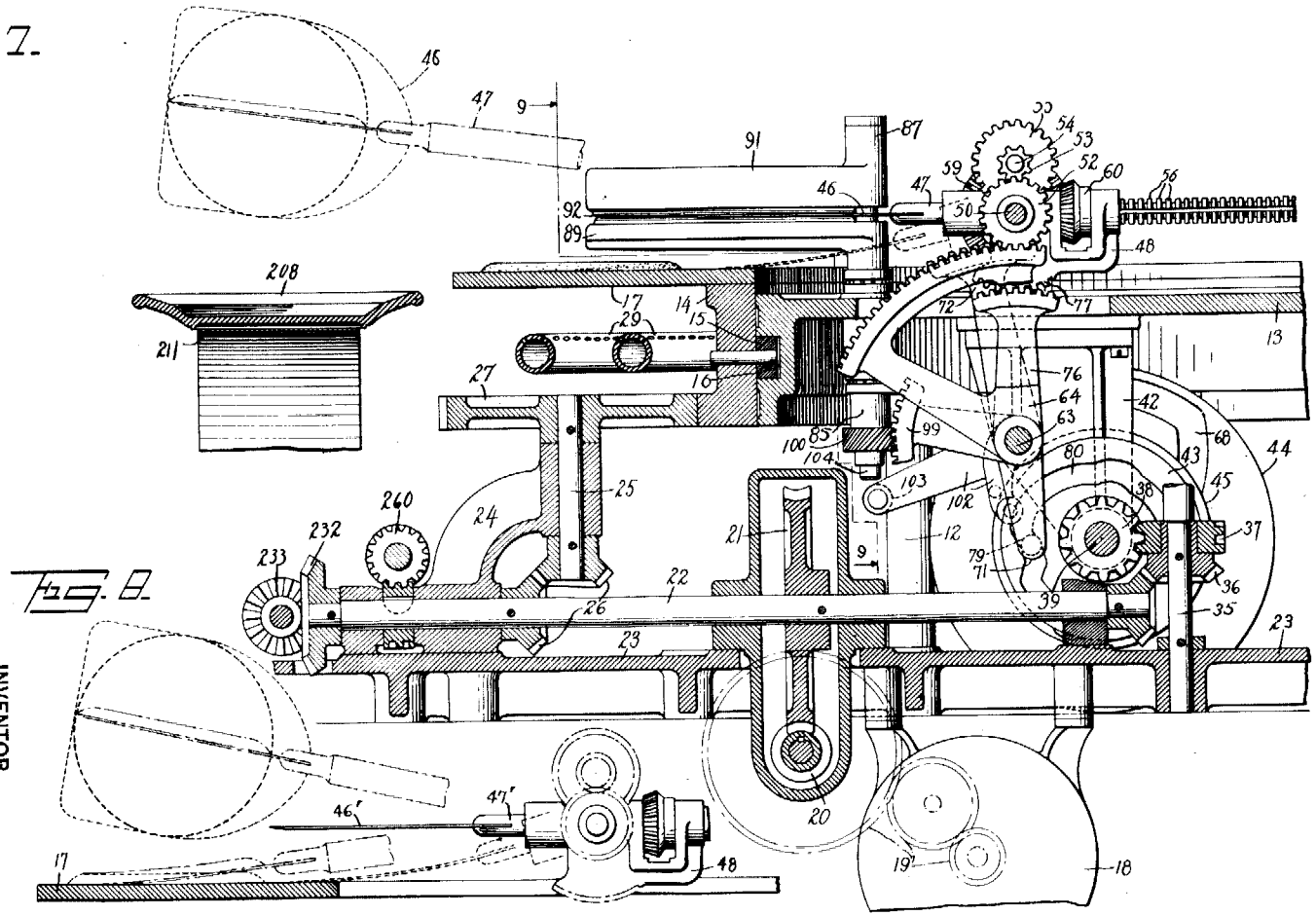
Fig. 7 is a view in vertical section taken on the line 7—7 of Fig. 9, and is substantially an enlargement of a portion of Fig. 3, illustrating the mechanism for turning a cake and placing it on a plate.
Fig. 8 is a detail view of a similar mechanism for turning a cake over on the griddle.

As shown by the drawings, the machine comprises a main frame 10 supported on suitable pedestals 11. Rising from the main frame 10, as shown particularly in Figs. 3 and 6 and 7 are columns 12 which support a circular frame 13. Fitted about the frame 13 is a ring gear 14 which is provided with rollers 15 adapted to engage a groove 16 formed in a depending annular flange of the frame 13. The ring gear 14 is thus given a roller bearing on the annular frame 13. Secured to the upper edge of the ring gear 14 is an annular griddle 17.

As shown particularly in Figs. 3 and 7, a motor 18 is carried by a table 23 which is fastened to the main frame 10, and, through a suitable train of gears 19, drives a worm 20. The latter in turn drives a worm gear 21 secured to a shaft 22, the shaft being journaled in suitable brackets supported on a table 23. One of said brackets also provides bearing 24 for a vertical shaft 25. The latter is driven by the shaft 22 through a pair of mitre gears 26. The upper end of the shaft 25 carries a driving gear 27 (see also Fig. 6) which engages the ring gear 14. Both the driving gear 27 and the ring gear 14 are mutilated so that the ring gear is moved while the driving gear passes through an angle of 90 degrees, but remains stationary while the driving gear is passing through the remaining 270 degrees. The gear ratio between these two gears is 15 to 1; in other words, for each complete turn of the driving gear the ring gear and the griddle which it carries turns through an angle of 24 degrees.

Supported on suitable brackets 28 under the griddle is a gas burner consisting of a pair of annular pipes 29 which are perforated along their upper edge to permit the outflow of gas and which are connected by a suitable connection 30 to a source of fuel supply. By means of this burner the griddle is maintained at the desired temperature. Obviously, in place of a gas burner some other heating means might be employed, such, for instance, as electric resistance elements.

The batter is fed to the griddle in suitable quantities by mechanism which will be explained presently. The cakes are baked as the griddle progresses step by step, and by the time each cake reaches the point T1 (Figs. 1 and 5) it is ready to be turned over and baked on the other side. Mechanism is provided for turning the cakes as they come to this point. The cakes then bake on the opposite side until they reach a point T2. Here they are successively lifted off the griddle and deposited on a plate carried by the conveyor.

*Turning mechanism*

In order to turn the cakes properly, a turner blade must slide forward in contact with the griddle under the cake and then must be lifted clear of the griddle, after which it must be turned over quickly to invert the cake and drop it on the griddle, and finally the blade must be withdrawn into position to be passed under the next succeeding cake. The turning mechanism at the point T1 is substantially like that at point T2 except for a difference in cam throw and length of turner handle; whereby at the point T1 the cake is turned over and deposited on the griddle, whereas at the point T2 it is carried beyond the griddle before being turned so that it will be deposited upon a plate carried by the conveyor.

As shown particularly in Figs. 3 and 7, there is a vertical shaft 35 which is centrally disposed with respect to the griddle 17. This shaft, which is suitably journaled in the table 23 and the frame 13, is driven by the shaft 22 through a pair of mitre gears 36. Secured to the shaft 35 is a spiral pinion 37 which drives a spiral gear 38 on a horizontal cam shaft 39. This shaft is perpendicular to the radial plane passing through the point T2, as shown particularly in Fig. 6.

It will be observed that there is another horizontal cam shaft 39′ which lies perpendicular to the radial plane drawn through the line T1. The shaft 39′ carries a spiral gear 38′ which is also driven by a spiral gear 37 on the shaft 35. The cam shaft 39 controls a mechanism for operating the turner located at T2 while the cam shaft 39′ controls the turner mechanism located at T1. In the drawings, Figs. 7 and 9 illustrate the turner mechanism located at T2 while Fig. 8 illustrates the turner mechanism located at T1.

The cam shaft 39 is supported in hangers 42 depending from the frame 13. On this cam shaft are secured cams 43, 44 and 45 (Fig. 9). The turner, at the point T2, consists of a blade 46 carried by a handle or shaft 47. (See Figs. 10 and 11.) The latter is adapted to slide in a bearing in an oscillating frame 48. The frame 48 oscillates on studs 50 projecting from brackets 51 carried by the frame 13.

Journaled on the stud 50 at one side of the oscillating frame is a gear 52 which engages a pinion 53 fast on a shaft 54. The latter is journaled in the oscillating frame 48 above the shaft 47. Secured to the shaft 54 is a driving gear 55 which projects through an opening in the top of the frame 48 and meshes with annular teeth 56 out in the shaft 47.

Mounted on the other stud 50 is a pinion 58, which is secured to a bevel gear 59, and the latter meshes with a bevel pinion 60, mounted on the shaft 47 and freely slidable with respect to said shaft. The pinion 60 carries a feather 61, (see Fig. 12) which engages a spline groove in the shaft 47, so that while the shaft is free to slide axially through the pinion 60, it will be turned by the pinion 60.

Journaled in suitable bearings above the cam shaft 39 is a shaft 63 (see Fig. 9). Fixed on this shaft, near one end thereof, is a gear segment 64 which meshes with the gear 52. Also fixed to the shaft 63, near the opposite end thereof, is a depending arm 66 which carries a roller 67 engaging a cam groove 68 in the face of the cam 44. Thus, under control of the cam 44 the segment 64 is oscillated and, through the gears 52 and 53 and 55, causes the shaft 47 to slide axially in the frame 48.

Mounted to turn freely on the shaft 63 is a hub 69 which carries an upwardly extending arm 70 and a depending arm 71. The arm 70 is formed at this free end with a toothed segment 72 which meshes with the gear 58. The arm 71 carries a roller 73 which engages a cam groove 74 in the cam 45. Thus, under control of the cam 45, the arm 70 is rocked about the shaft 63 as a center and through the gear train 72, 58, 59 and 60 and causes the shaft 47 to turn on its axis.

The shaft 63 also has a hub 75 which turns freely thereon and from which arises a toothed segment 76. The latter meshes with a toothed segment 77 formed on the bottom of the oscillating frame 48. Depending from the hub 75 is an arm 78 which carries a roller 79 engaging a groove 80 in the cam 43. Thus, under control of the cam 43 the sector 76 will be oscillated about the shaft 63, causing the frame 48 to tilt or oscillate about the studs 50 as an axis.

The mechanism for operating the turner at the point T1 is so nearly identical with that at point T2 that it needs no detailed description. The turner at T1 has a blade 46′ fixed upon a shaft 47′ which is shorter than the shaft 47. The cam shaft 39′ carries cams corresponding to those on shaft 39 except that the cam 44′ (Fig. 6) on the shaft 39′ is smaller than the cam 44 and the cam groove therein is slightly different, since the turner blade 47′ which it controls need reciprocate only far enough to pick up a cake. The shafts are so turned as not to interfere with each other.

*Turner wiping and greasing mechanism*

Adjacent each turner is a device for wiping and greasing the turner blade after each operation of the turner. (See Figs. 5, 7, 9 and 13.) Suitably journaled in the frame 13 adjacent each turner is a hollow vertical shaft 85, in which slides a rod 86. Fast to the upper end of the rod is a sleeve 87 which fits over the shaft 85 and is splined thereto, so that it may slide vertically thereon. A spring 88 serves to hold the rod 86 in its lowermost position.

Secured to the shaft 85 is a member 89 in the form of a long shallow tray, in which is fitted a pad 90 of felt or other absorbent flexible material. Immediately above the member 89 is a member 91 of similar profile, which is integrally connected with the sleeve 87. The member 91 carries a pad 92 of flexible material which is adapted normally to bear against the pad 90. Immediately above the pad 92 there is a horizontal web 93 in the member 91 which forms the bottom of a shallow tray 94. In this tray grease may be placed and there are apertures 95 in the web 93 through which the grease may percolate into the pad 92, whence it finds its way into the pad 90.

After a turner has turned a cake, pad 92 is raised and the two pads are swung about the axis of shaft 85 so that they pass respectively above and below the turner blade. Thereupon pad 92 closes down upon the blade and the two pads return to their normal position, at the same time greasing the blade and wiping off any particles that might adhere thereto.

These movements of the wipers and greasers, as illustrated in Figs. 7, 9 and 13, are controlled by the cams 45 and 45′ on shafts 39 and 39′ respectively (see also Fig. 6). Each of the cams 45 and 45′ on the face opposite that engaged by the roller 73, is formed with a groove 96 engaged by the roller 97. This roller is mounted on one arm of a bell crank lever 98 freely journaled on the cam lever shaft 63. The other arm of the bell-crank lever is formed with a spiral toothed segment 99 which engages a spiral pinion 100 fixed to or integral with the lower end of the shaft 85. Thus under control of the cam groove 96 and in proper synchronism with the operation of the adjacent cake turner, the bell-crank lever 98 will be turned on the shaft 63 causing the shaft 85 to turn on its axis and swing the pads 90 and 92 across the turner.

Separation of the pads is effected by a second bell-crank lever 102 freely journaled on the shaft 63. One arm of lever 102 carries a roller 103 which normally lies immediately below a button 104 on the lower end of the rod 86. The other arm of the lever carries a roller 105 adapted to engage a lug 106 on the face of the cam 45. The lug is so positioned as to swing the lever 102 on its axis just as the pads start to swing across the path of the turner blade. When the lever 102 is swung upward by the lug 106, the roller 103 strikes the button 104 raising the shaft 86 and with it the pad 92, so that the latter will pass above the turner blade. Immediately thereafter the roller 105 passes off the lug 106 and the spring 98 causes the pad 92 to drop, so that the turner blade is tightly gripped between the pads 90 and 92 as the latter return to normal position, and thus the blade is wiped and greased. On the bell-crank 102 is a roller 107 which normally bears against the periphery of the cam 45 and holds the bell-crank 102 in the position illustrated in Fig. 13.

*Batter feed control*

The mechanism for controlling the feed of batter to the griddle is shown principally in Figs. 14 to 29 inclusive.

The batter reservoir consists of a vessel 110, preferably of glass, with a metal base member 111 and a metal top 112, the base member and top being connected by bolts 113. The metal top is provided with a cover 114, by which access may be obtained to the interior of the reservoir. The base member 111 is formed with a spout opening into a cylindrical valve chamber 115 in which is fitted a rotary measuring valve 116. At each complete turn of this valve, enough batter is measured out and dropped through an opening 117 in the bottom of the valve chamber to form a single cake. This opening is directly above the griddle 17.

The base 111 is formed with a pair of hollow cylindrical bosses 120 and 120' located on opposite sides of the valve chamber. These bosses are adapted to fit upon a pair of studs 121 and 121' respectively which project from a bracket 122 mounted on the frame 13. The valve 116 is fixed upon a shaft 125 which projects through a stuffing box 126. The shaft 125 has a flattened end 125' adapted to engage the slotted end of an alined shaft 127 journaled in a suited bearing in the bracket 122. The shaft 125 is thus rotatively coupled to the shaft 127, but may be withdrawn therefrom axially whenever it is desired to remove the batter reservoir from the machine.

Fixed to the shaft 127 is a pinion 128 which meshes with an idler gear 129 and the latter in turn meshes with a driving gear 130. The gear ratio is such that for each turn of the driving gear the valve 116 will be rotated three times and hence will deposit three portions of batter on the griddle 17. As explained above, this machine is designed to bake and deliver orders of griddle cakes, each order consisting of three cakes and hence one turn of the gear 130 represents the filling of one order.

The driving gear 130 is fixed upon one end of a sleeve 131 which is journaled to turn freely on a horizontal shaft 132. Near its other end the sleeve is formed with a flange 134, the periphery of which is shaped to form a profile cam. The purpose of this cam will be explained hereinafter. The shaft 132 is journaled in the bracket 122 and a bracket 133. Fixed on the shaft 132 is a spiral pinion 135 which meshes with a spiral pinion 136 fixed on a vertical shaft 137. The latter is driven by a pinion 138 fixed on the shaft 35, which engages a gear 139 keyed to the shaft 137, as shown in Fig. 6.

A clutch, which for convenience we may call the batter feed clutch, is provided for connecting the shaft 132 and the sleeve 131. As shown particularly in Figs. 17, 24 and 25, a clutch collar 140 is keyed to the shaft 132 within an annular extension 141 of the sleeve 131. In the periphery of the collar 140 are notches 142 adapted to be engaged by a pin 143 which slides in a slot 144 in the extension 141. The pin is pivotally connected at its outer end to one arm 145 of a three-armed lever 146. The latter is pivotally supported on the flange 134. A spring 148 connected to a second arm of the lever 146 tends to turn the lever on its pivot and force the pin 143 inwardly toward the clutch collar 140. Normally, however, the pin is held out of engagement with the collar by a shoulder 149 on an arm 150 which engages the third arm of the lever 146 and presses the latter against a stop pin 151 carried by the flange 134. When the arm 150 is raised clear of the lever 146, the spring 148 presses the pin 143 against the collar 140 and the inner end of the pin enters the first notch 142 that passes the slot 144, thus clutching the sleeve 131 fast to the shaft 132. This clutch engagement will continue until the sleeve has made one complete turn, when, if the shoulder 149 lies in the path of the lever 146, the latter will be turned on its pivot against the pin 151 and the pin 143 will be withdrawn from engagement with the clutch collar. Rotation of the sleeve will thus be stopped. However, as long as the arm 150 is raised clear of the lever 146, the sleeve will continue to rotate.

Figure 25:
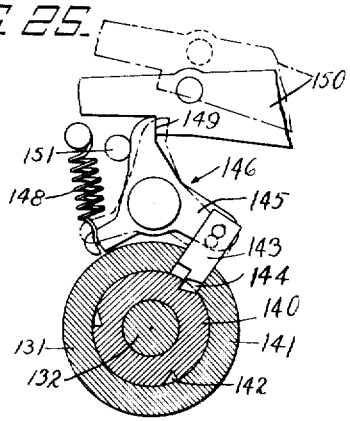
Fig. 25 is a view in section taken on the line 25—25 of Fig. 24.

In order to insure withdrawal of the pin without too great a strain on the associated parts, means are provided for speeding the rotation of the sleeve, so that it will override the clutch collar just as the pin 143 reaches the declutching position. This is effected by providing an arm 155, (Fig. 17 pivoted to the bracket 122 and carrying at its free end a roller 156. The latter is pressed by a spring 157 against the periphery of the flange or cam 134. The cam is formed with an incline 158 which is engaged by the roller just as the pin 143 is about to reach the declutching point, and the pressure of the roller against this incline tends to drive the cam ahead at increased speed so that it overrides the clutch collar. As shown in Fig. 25, each notch 142 is formed with a radial rear wall and a forwardly inclined front wall and the pin 143 is correspondingly formed so that overriding of the clutch collar by the sleeve tends automatically to eject pin 143 from the notch.

The ratio of the pinion 138 to the gear 139 is such that the pinion must make three turns to effect a single rotation of the shaft 137 and hence also of the shaft 132. Thus, while there is a three to one reduction of speed between the shaft 35 and the batter feed clutch shaft 132, there is a one to three increase of speed between the clutch and batter valve 116. Thus the latter, when running, turns at the same speed as the shaft 35 and for each deposit of batter, there will be an operation of the turner mechanisms because the pinion 37 is of the same pitch diameter as the driven pinlons 38 and 38' on the cam shafts 39 and 39' of the turner mechanisms. It will be understood that the turner mechanism operates continuously while the measuring valve is operated only on order, but that on each order the valve will operate three times to deposit three portions of batter on the griddle.

*Order accumulator*

The arm 150 turns freely on a shaft 160 (Fig. 17) and the latter in turn is journaled in suitable bearings in the bracket 122 and a bracket 161 (Fig. 19). The arm 150 is held down in position to engage the lever 146 by a pin 162 projecting from a ratchet wheel 163 (Figs. 14, 17, 20 and 28) journaled to the shaft 160. However, a spring 164 normally urges the arm 150 upward so that as soon as the pin 162 is moved out of engagement with the lever 150, the latter will spring upward, permitting the spring 148 to throw in the batter feed clutch.

Secured at one end to the ratchet wheel 163 and at the other end to a hub 164 pinned to the shaft 160 is a spiral spring 165 (see Fig. 20). This spring is encased in a suitable housing 165' which tends to turn the ratchet wheel clockwise as viewed in Fig. 28. The ratchet wheel is turned with a step by step movement against the tension of the spring 165 by a pawl 166 pivoted on one end of a lever 167. This lever is journaled on the shaft 160 and a spring 168, acting on the other end of the lever, tends to hold the lever against a stop pin 169. This pin also serves as a stop for the pawl 166 and serves to hold the pawl normally clear of the ratchet wheel 163 against the tension of a spring 170.

The lever 167 is formed with a hub 172 from which projects an arm 172'. The latter is connected by a rod 173 to a plunger 174 in a solenoid 175 (see Figs. 15 and 19). Thus, at each actuation of the solenoid 175, the lever 167 will be turned on the shaft 160, drawing the pawl clear of the pin 169, and permitting it to engage the ratchet wheel 163 and turn the latter through the space of one ratchet tooth. This will carry the pin 162 clear of the arm 150 permitting the batter feed clutch to be thrown in.

Figure 28:
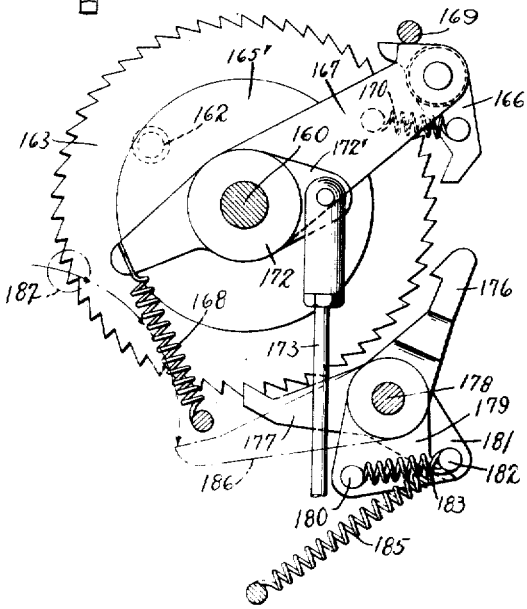
Fig. 28 is a detail view of an escapement mechanism employed in connection with the batter feed mechanism.

The ratchet wheel 163 is held against the tension of the spiral spring 165 by an escapement which comprises a pair of opposed pallets 176 and 177 (Fig. 28). These pallets are mounted on a shaft 178 journaled in the brackets 122 and 161. The pallet 177 is fixed on the shaft 178 but the pallet 176 is free to turn thereon. The pallet 176 has a rearward extension 179 which carries a pin 180 while the pallet 177 has a rearward extension 181 which carries a pin 182. A tension spring 183 connects the pins 180 and 182, holding the extension 179 in engagement with the pin 182 and maintaining the pallets normally in the position illustrated. The purpose of the spring connection between the pallets will be explained hereinafter. A spring 185 attached to the pin 182 serves to hold the pallet 177 normally in engagement with the teeth of the ratchet wheel 163. Fixed on the shaft 178 is an arm 186 which projects in the path of a pin 187 carried by the flange 134 (see Figs. 17 and 28). Thus at each turn of the flange 134 the escapement will be tripped and the ratchet wheel will be stepped back by the spiral spring 165 under control of the escapement.

If the arm 150 should be held down by means presently to be described, successive actuations of the solenoid would carry the ratchet wheel with a step by step movement, accumulating a number of orders thereon and finally, when the arm 150 was released, the batter feed clutch would be thrown into engaging position and the measuring valve would make successive deposits of batter upon the griddle to fill the orders. At each turn of the flange 134 the ratchet wheel 163 would be stepped back until the measuring valve had made a sufficient number of deposits to fill all the orders accumulated on the ratchet wheel. When the orders were thus all filled, the pin 162 would be carried back into position to engage and depress the arm 150, declutching the batter valve gear and stopping the batter feed. Should the solenoid be operated at the instant when the escapement was being tripped by the pin 187, there would be no interference or conflict of parts; the pallet 176, being connected to the pallet 177 by the spring 183, would merely ratchet over a tooth of the wheel 163 while the wheel was being turned clockwise (as viewed in Fig. 28) by the pawl 166.

*Plate and batter feed synchronizing mechanism*

It will be evident from the description so far given that energizing the solenoid 175 will start the batter valve mechanism and cause enough batter to be deposited on the griddle to fill an order and as the cakes are carried around by the griddle they will be turned at the point T1 and again at the point T2, but that at the latter point the cakes will be lifted clear of the griddle and deposited on a plate carried by the conveyor D. Obviously, therefore, there must be some provision for synchronizing the plate supply with the order mechanism so that there will be a plate waiting to receive each order when it is ready. Such synchronizing mechanism will now be described:

As shown in Figs. 14, 15, 21 and 24, the extension 141 of the sleeve 131 carries an annular face cam 190. A lever 191 is pivoted to swing in a horizontal plane immediately in front of the cam and carries a roller 192 which lies in the path of a swell 193 on the cam 190. A spring 194, acting on the lever 191, serves to hold the roller 192 in constant engagement with the cam 190. On the shaft 132 is a pinion 195 which meshes with a gear 196. This gear is suitably journaled in the bracket 133. Running transversely through the rim of the gear 196 is a series of holes in which are fitted pins 197.

Figure 29:
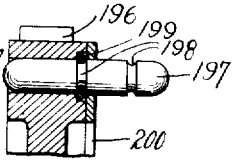
Fig. 29 is a view in section, of a portion of a pin disk, the section being taken on the line 29—29 of Fig. 15.

A detail of one of the pins is shown in Fig. 29. Each pin is formed with two circumferential grooves 198 adapted to receive a split ring 199 which is sprung about each pin and seated in a recess in the face of the gear. An annular retaining plate 200, through which the pins project, holds all the rings 199 in place on the gear. The pins are pushed back and forth through the holes in the gear and are held in either of two positions by the split rings 199 which occupy one or the other of the grooves 198, as the case may be. Normally the pins project from the rear face of the gear 196, that is, the right-hand face that is viewed in Fig. 21.

The purpose of the cam 190 and arm 191 is to push a pin forward in response to the filling of each order, or, in other words, at each turn of the sleeve 131 which drives the batter valve, the arm 191 is pushed forward by the cam swell 193, and a hammer 201 on the end of the arm strikes the pin 197 which at the moment is alined therewith, forcing the latter forward so that it projects from the front face of the gear 196 and in the path of an arm of a bell-crank lever 202. The other arm of this lever has a rod 203 connected thereto and this rod operates the plate supplying mechanism. The gear 196 turns at such a rate with respect to that of the griddle that the pin 197 reaches the bell-crank 202 just before the first cake of the order filled at the time that the pin was set reaches the point T2 on the griddle. Operation of the bell-crank, as will be explained hereinafter, permits a plate to move into position to receive the cake, and the plate is held in the receiving position until the three cakes of the order have been deposited thereon, by which time the projecting pin will strike a second lever 204, thereby lifting a connecting rod 205 which, as will be explained presently, releases the plate and permits it to be carried off by the conveyor to the delivery box E. In the meantime, the projecting pin 197 is carried past a fixed cam 206 (Figs. 14 and 15) having an inclined face which pushes the pin back to normal position.

*Plate supplying mechanism*

Figure 2:
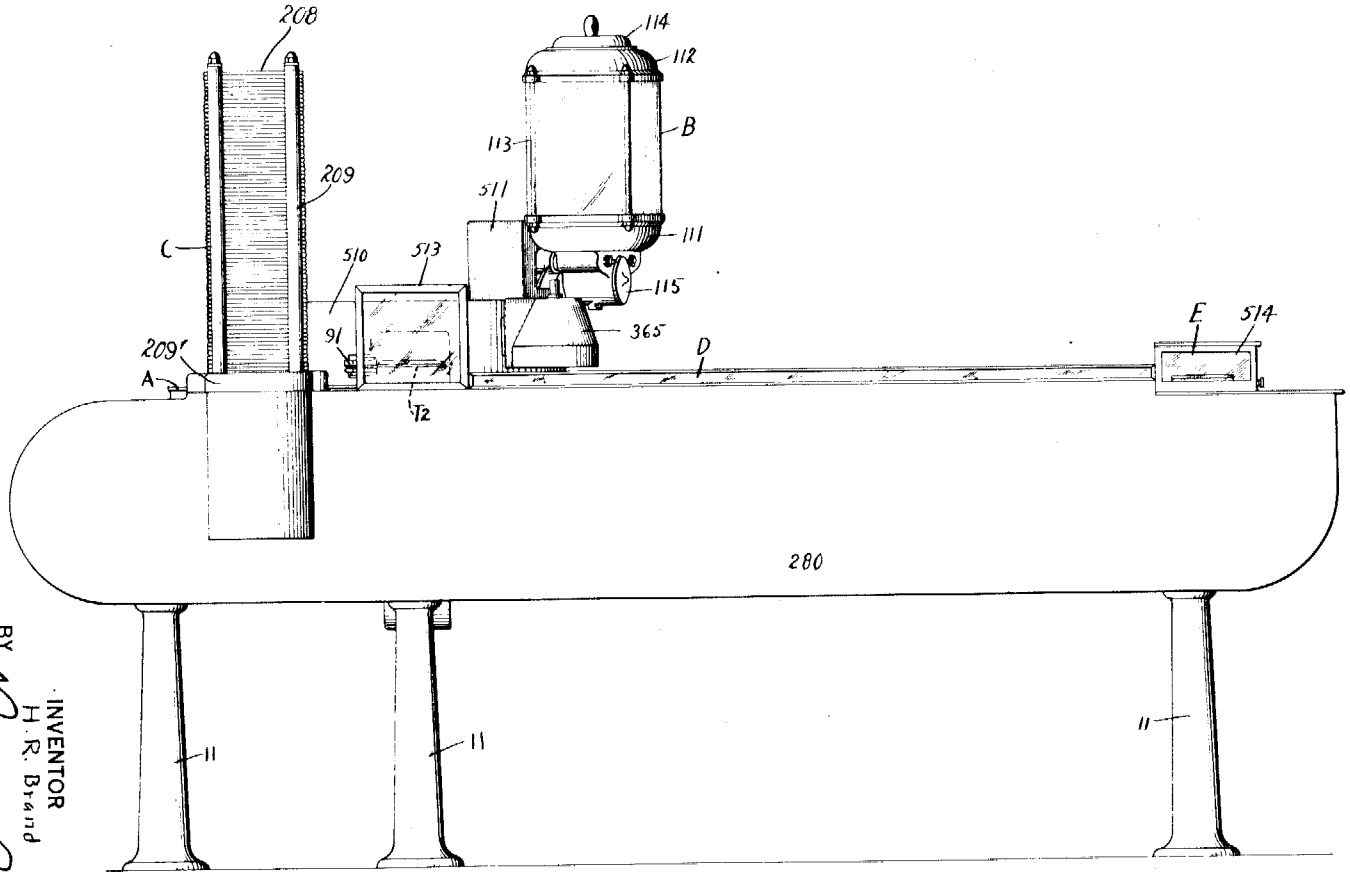
Fig. 2 is a front elevation of the same.
Figure 4:
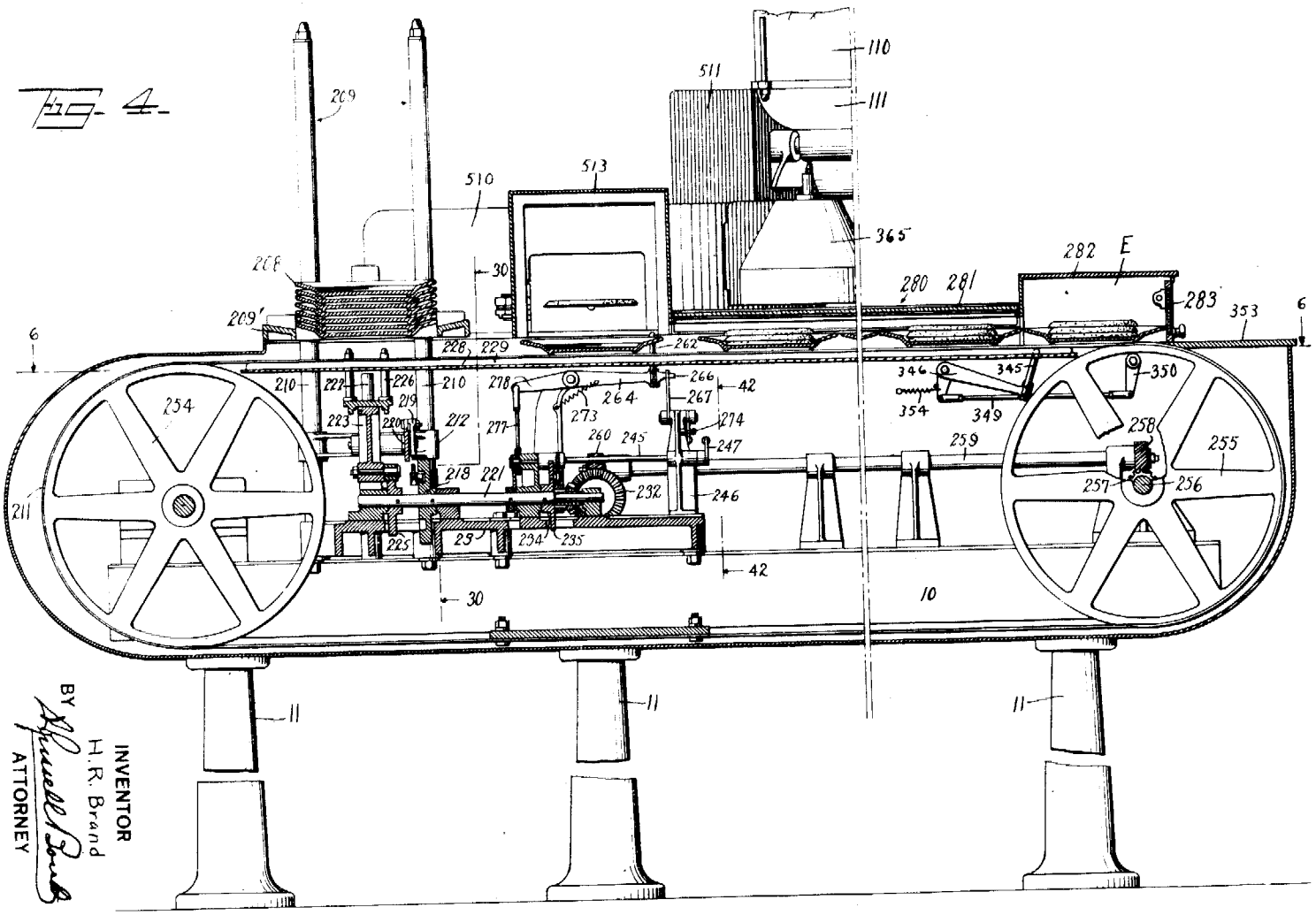
Fig. 4 is a view in vertical section taken on the line 4—4 of Fig. 1 and showing, mainly, a conveyor system used in connection with my machine.
Figure 31:
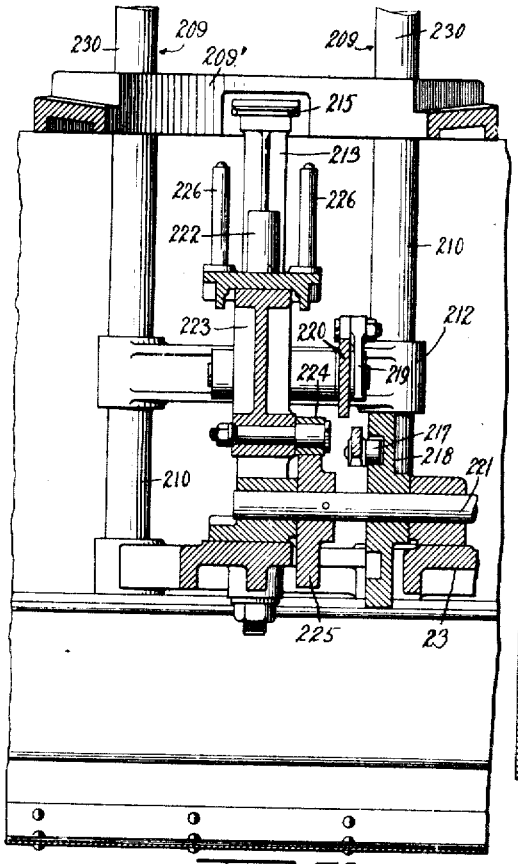
Fig. 31 is a view in section taken on the line 31—31 of Fig. 30.
Figure 32:
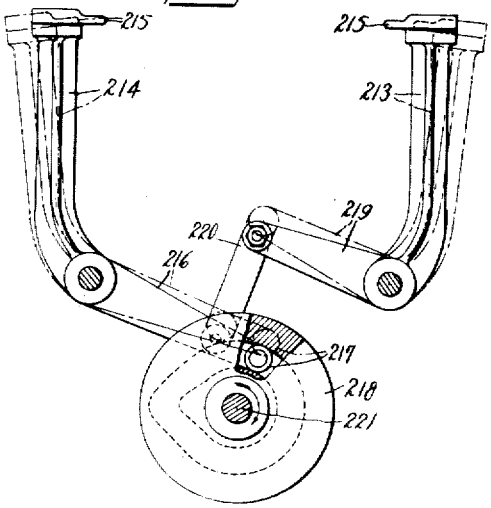
Fig. 32 is a view illustrating certain details of the plate delivering mechanism.

As shown in Figs. 2 and 4, plates 208, on which the cakes are to be deposited after they have been baked, are stacked at C above the conveyor D and are withdrawn, one at a time, from the bottom of the stack. Four vertical rods 209 rise from a base frame 209' which in turn is supported on four posts 210 carried by an extension of the table 23. There is a pair of these posts at each side of the upper reach of the conveyor belt 211 (see Figs. 4, 30 and 31). A yoke 212 connects the posts of each pair. Pivotally supported by the yokes are two bell-crank le.ers 213 and 214 provided with vertical arms which are formed at the upper ends with inwardly projecting fingers 215 (Fig. 32). The lever 214 has an arm 216 which carries a roller 217 engaging a cam 218, while the other lever 213 has an arm 219 connected by a link 220 to the arm 216.

The cam 218 is keyed to a shaft 221 suitably journaled in bearings supported by the table 23.

Rising from the table 23 are two posts 222, one at each side of the shaft 221. These posts serve as guides for a carriage 223 which slides vertically on them. A roller 224 on the carriage bears on the periphery of a cam 225. The carriage is raised by the cam and is returned to normal position by gravity. Projecting from the top of the carriage are four pins 226, each preferably provided with a rubber tip. The pins project through apertures in a transverse plate 228 which extends lengthwise of the conveyor, under the upper reach of the belt 211. The plate is formed with longitudinal ribs 229 which support the belt when it is loaded with plates.

Figure 30:
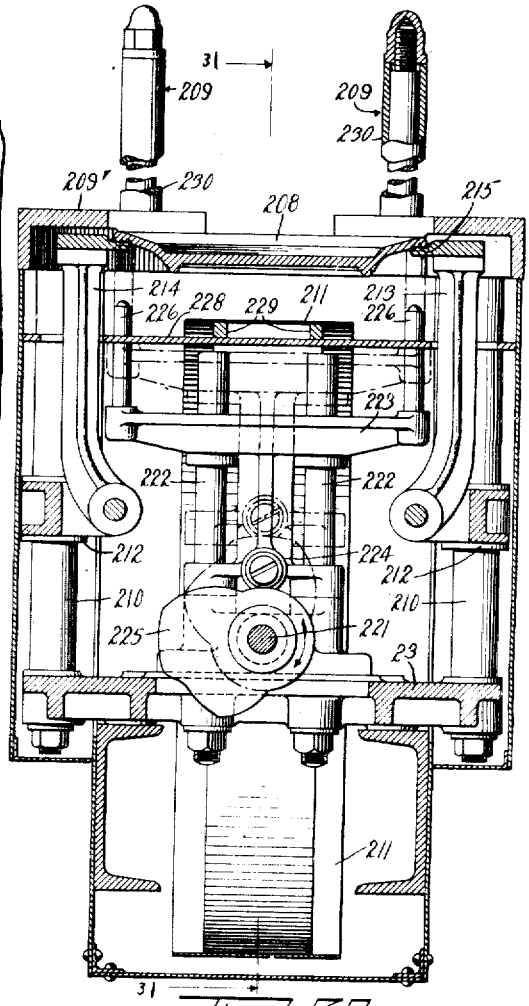
Fig. 30 is a view in section taken on the line 30—30 of Fig. 4 and illustrating a mechanism for delivering plates to the conveyor.

The rods 209 serve as guides to hold the stack of plates in vertical alinement and may be fitted with sleeves 230 of some soft material, such as rubber, to prevent breaking or chipping of the plates. The frame 209' is apertured to permit the plates to pass therethrough. Normally the bottom plate of the stack lies within this aperture resting on the fingers 215 above the upper reach of the conveyor belt 211, as shown in Fig. 30.

Figure 34:
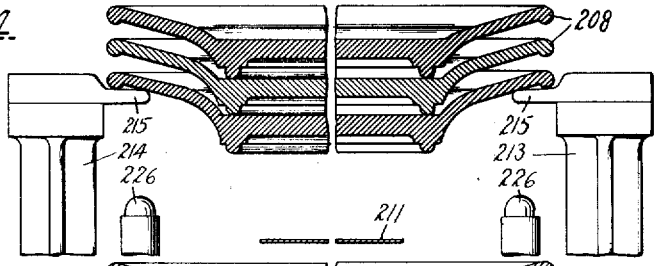
Figs. 34, 35, 36 and 37 illustrate successive positions of the mechanism for removing a plate from the bottom of a stack and delivering the plate to the conveyor.
Figure 35:
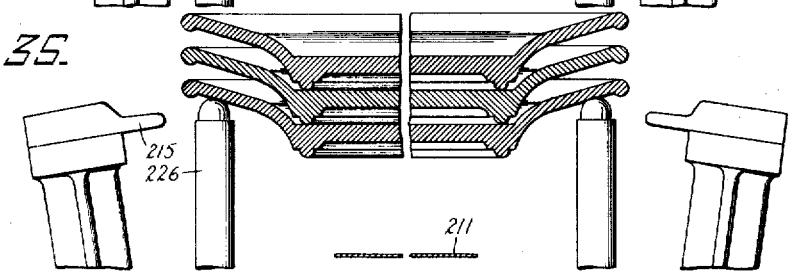
Figure 36:
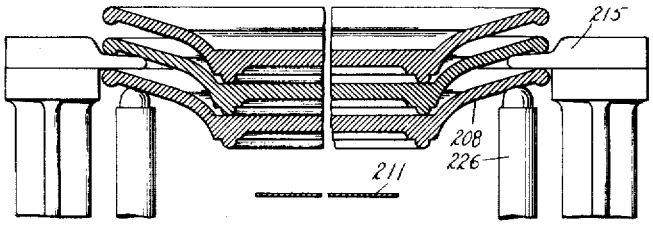
Figure 37:
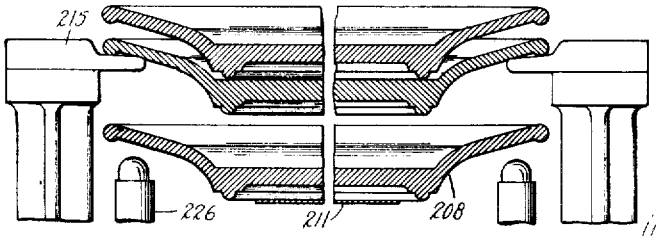

When the shaft 221 is rotated, the carriage 223 is raised, lifting the pins 226 from the position shown in Fig. 34 to that shown in Fig. 35. As the pins contact with the lowermost plate of the stack, the fingers 215 are withdrawn by the cam 218, from the position shown in full lines in Fig. 32 to that shown in broken lines, or from the position shown in Fig. 34 to that shown in Fig. 35. Then the pins 226 move downward under control of the cam 225 and are temporarily arrested in such position that the fingers 215, when returned to normal position by cam 218, will slip between the rim of the bottom plate and that of the next plate in the stack, as shown in Fig. 36. Thereupon the pins will resume their downward movement to normal position as shown in Fig. 37, and in so doing deposit the bottom plate on the belt 211. The plate is immediately carried forward by the belt to a point of tangency with the griddle at T2 so as to be in position to receive an order of cakes.

To drive the shaft 221, a bevel gear 232, Fig. 42, is keyed to the shaft 22 and meshes with a pinion 233 mounted on the shaft 221. The pinion drives the shaft through a clutch of any suitable type. In the particular embodiment illustrated, the employed clutch is of the same kind as the batter feed clutch. A clutch member 234 provided with a flange 235 carries a three armed lever 236 similar to the lever 146. The lever 236 carries a pin (not shown) which is urged by the spring 237 into engagement with a notched shank of the pinion 233. Normally, the pin is held clear of the pinion shank by a detent 238 engaging one arm of the lever 236. The periphery of the flange 235 serves as a cam and is engaged by a roller 240, carried by an arm 241, which is urged toward the cam by a spring 242. The cam is formed with a peripheral incline 239 against which the roller 240 bears when the lever 236 is about to engage the detent 238 and withdraw the clutch pin. At such time, by reason of the pressure exerted by the roller 240 against the incline 239, the clutch member 234 is urged forward so that it will override the pinion 233 freeing the clutch pin and permitting of its ready withdrawal when the detent 238 strikes the lever 236.

The detent 238 is secured to a shaft 245 journaled in a bracket 246. A substantially vertical arm 247, also secured to the shaft 245, is pivotally connected to one end of a rod 248. The other end of the rod is connected to one arm 249, (see Fig. 43) of a bell-crank lever pivotally supported by a bracket 250 below the table 13. The other arm 251 of the bell-crank is pivotally connected to the vertical rod 203 (see Figs. 6, 15, 40, 42 and 43). Thus, when a pin 197 strikes the lever 202, the detent 238 is raised, throwing in the clutch, which actuates the plate supply mechanism to take a plate 208 from the bottom of the stack and deposit it upon the conveyor belt 211.

*The plate conveyor*

The conveyor belt 211 passes about two large pulleys 254 and 255 located respectively on opposite ends of the conveyor D. These pulleys are suitably journaled in brackets carried by the main frame members of the machine. The pulley 254 is an idler and the belt is propelled by the forward pulley 255. The latter is fixed to a shaft 256 which is driven through a pair of spiral pinions 257 and 258, by a shaft 259. The latter shaft, in turn, is driven by the shaft 22 through a pair of spiral pinions 260 and 261. Since the belt 211 is running continuously, as soon as a plate 208 is deposited thereon from the stack, it is immediately carried forward or toward the right, as viewed in Fig. 4.

When the plate 208 reaches the point of tangency to the griddle, it is arrested by a pair of fingers 262 which project through openings in the plate 228. The fingers 262 are carried respectively by arms 263 and 264 which are secured to a shaft 265. The arm 264 has a forwardly projecting lug 266 which normally rests on a shoulder of an arm 267. The latter is secured to a shaft 268 journaled in the bracket 246, and secured to the shaft is another arm 269 which is pivotally connected to one end of a substantially horizontal rod 270. The other end of this rod is operatively connected to the vertical rod 205 through a bell-crank 271 (see Figs. 6 and 43). Hence, when the pin 197 (Fig. 15) strikes the lever 204, the arm 267 will be swung away from the lug 266, permitting the arm 264 to drop under tension of a spring 273, as shown by broken lines in Fig. 40, thereby withdrawing the fingers 262 and permitting the plate to proceed with the belt 211. A spring 274 urges the arm 269 to a vertical position, as shown by full lines in Fig. 41 so that the arm 267 will snap under the lug 266 as soon as the arm 264 is raised to the normal position shown by full lines in Fig. 40.

The arms 263 and 264 are restored to their normal position, with the fingers 262, in position to intercept the next succeeding plate, by means of a cam 275 (see Fig. 44) which is pinned to the shaft 221. This cam is adapted to rock a lever 276 at each turn of the shaft, and the lever is connected by a rod 277 to a rearward extension 278 of the arm 264. Thus, after each plate has been released from the position indicated in Fig. 40, the fingers are raised again before the shaft 229 has completed a full rotation so that they will lie in the path of the next succeeding plate.

Figure 1:
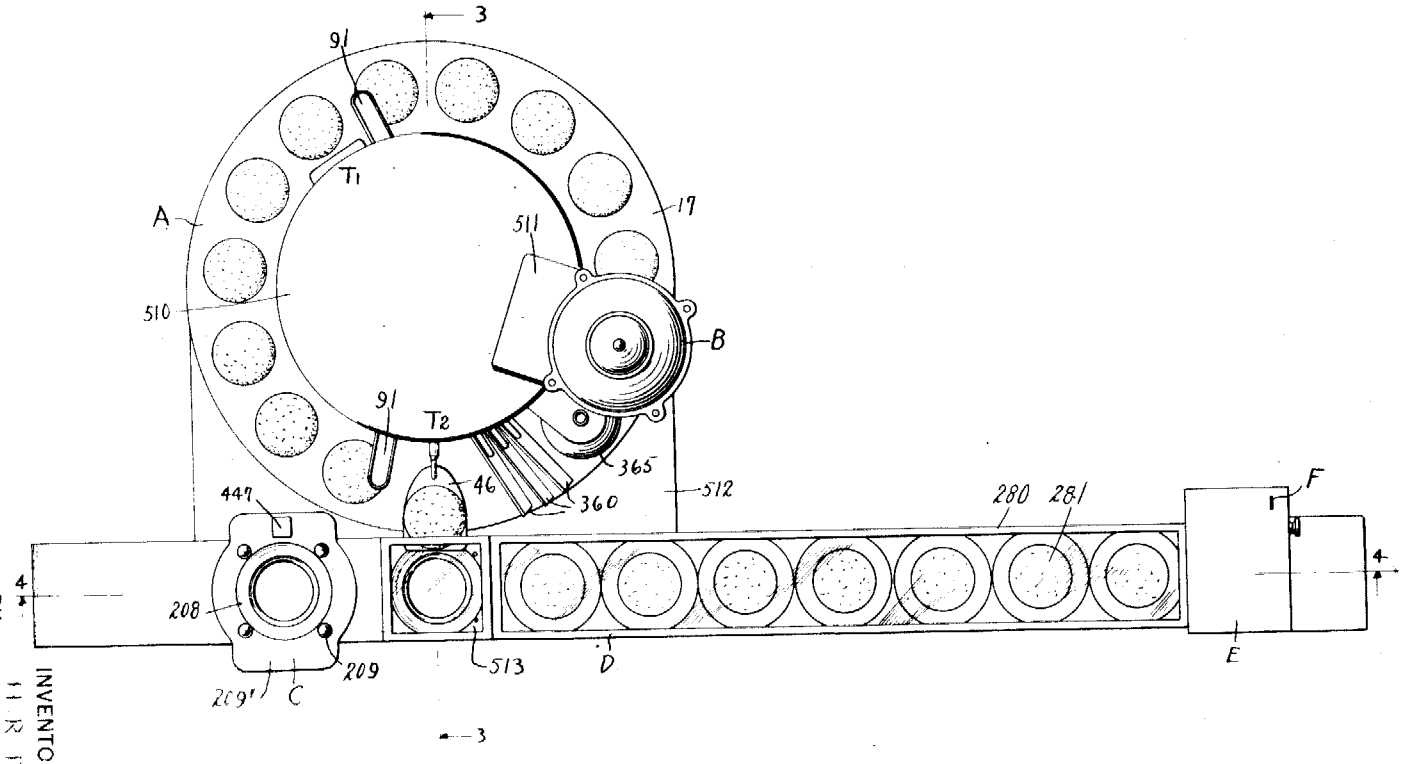
Fig. 1 is a top plan view of my machine.

A casing 280, preferably formed with a glass top 281 encloses the upper reach of the conveyor belt and terminates at the right hand end thereof, as viewed in Fig. 1, in the delivery box E.

*The delivery box*

Figure 50:
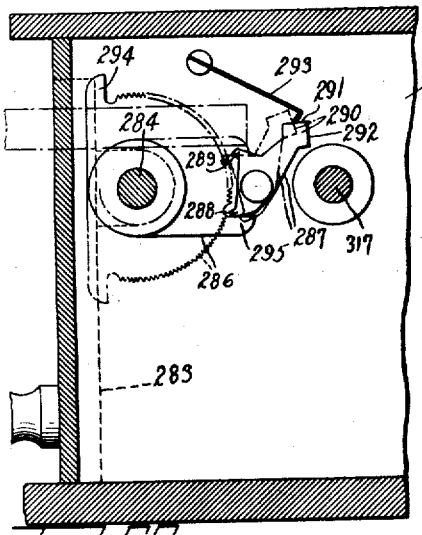
Fig. 50 is a detail view of a locking mechanism employed on the door of the delivery box to control complete opening and closed of the door.
Figure 53:
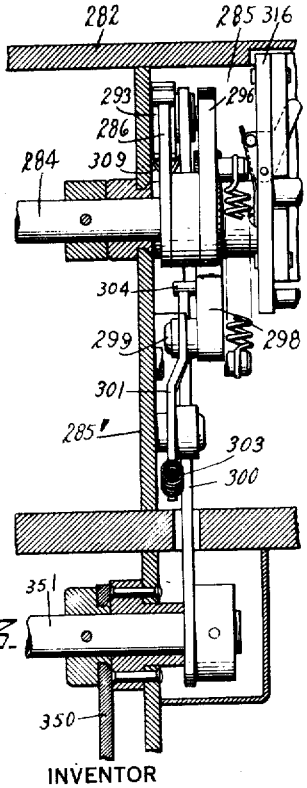
Fig. 53 is a view in section taken on the line 53—53 of Fig. 52.

The delivery box consists of a rectangular casing 282 (Figs. 45 and 46), provided with a door 283, at the forward end, which is hinged upon and secured to a horizontal shaft 284. At the right hand side of the delivery box, as viewed in Figs. 46 and 53, is a compartment 285 which contains the token receiving mechanism. A wall 285' separates the compartment from the main body of the token box. The shaft 284 projects into this compartment and has secured thereto a segmental ratchet wheel 286, as best shown in Fig. 50. A ratchet pawl 287 is pivoted adjacent the segment 286. The pawl is provided with teeth 288 and 289, at opposite sides of its pivot, which are alternately brought into engagement with the teeth of the ratchet segment 286. The pawl 287 is provided with a rearward extension 290 formed with a pair of oppositely inclined faces 291 and 292. A spring 293 engages one or the other of said faces, depending upon the position of the pawl. Thus, in Fig. 50 which shows the door 283 in closed position, the pawl is shown in full lines with the face 291 engaged by the spring 293. As the door is pulled open to the position indicated by dotted lines, tooth 288 of the pawl will ratchet over the teeth of the segment 286 but will prevent the door from being closed until it has been opened to its full extent, namely, the position indicated by the broken lines in Fig. 50. In this position an ear 294 on the ratchet segment will strike the pawl 287 and move it to the position indicated by dotted lines, so that the spring 293 will now engage the face 292. This will withdraw the tooth 288 from the ratchet segment and move the tooth 289 into position to engage the ratchet teeth, so that the door may now be moved to closed position and the tooth 289 will ratchet over the ratchet segment as long as the door is being closed but will resist opening of the door until it has been moved to completely closed position. Just as the door reaches the completely closed position an ear 295 on the ratchet segment will strike the pawl 287 and restore it to the position shown by full lines in Fig. 50. Thus a means is provided for insuring completing opening of the door 283 once it has been started in the opening direction and also to insure complete closing of the door once it has been started in the closing direction.

Also secured to the shaft 284 within the compartment 285 is a toothed segment 296 (Fig. 52) which meshes with the toothed hub 297 of an arm 298. This arm carries a roller 299 which bears against a lever 300. Thus when the door 283 is moved to open position, the lever 300 is swung to the position shown by broken lines in Fig. 52, and is held in such position by a bell-crank lever 301, one arm of which snaps over a lug 302 carried by the lever 300. The lever 301 also has an arm which bears against the roller 299, being pressed against said roller by a spring 303.

On the arm 298, there is a pin 304 which is adapted to engage a contact lever 305 when the door has been swung to open position, moving the contact lever to the position shown by broken lines. The contact lever is normally held against a stop 306 by a spring 307 and occupies the position shown by full lines in Fig. 52. Secured to the contact lever and insulated therefrom is a contact blade 308 which, when the lever is moved to the broken line position by engagement with the pin 304, bridges a pair of electrical contacts 309, thus completing an electrical circuit for a purpose which will be explained hereinafter.

*Token receiving mechanism*

Within the compartment 285 is a token receiver which controls the opening of the door 283. This token receiver may be of any suitable type which will respond to a token of predetermined character and which will prevent the opening of the door until such token has been inserted in the token receiver.

In the present embodiment of my invention, I have shown token and receiver similar to those already disclosed in my copending application Serial No. 204,325, filed July 8, 1927. This token receiver may be briefly described as follows:

In the upper wall of the casing 282, (Figs. 48 and 49) there is a slot 310 through which the token is inserted into the receiver. Within the compartment 285 and immediately below the slot 310 are a pair of grooved guideways 312 in which the token is adapted to slide. The token may be a rectangular piece of metal of the type indicated at 311 in Fig. 47 with one corner cut off to present an inclined edge 313. Projecting through one of the guideways 312 is a spring-pressed detent finger 315 adapted to prevent entrance of a token unless correctly presented. Thus, the finger will exclude a token unless it is introduced in such position that the inclined edge 313 will push the finger 315 aside. The tokens which will actuate the token receiver are distinguished from other tokens by perforations 314 arranged in a characteristic combination of locations.

Figure 51:
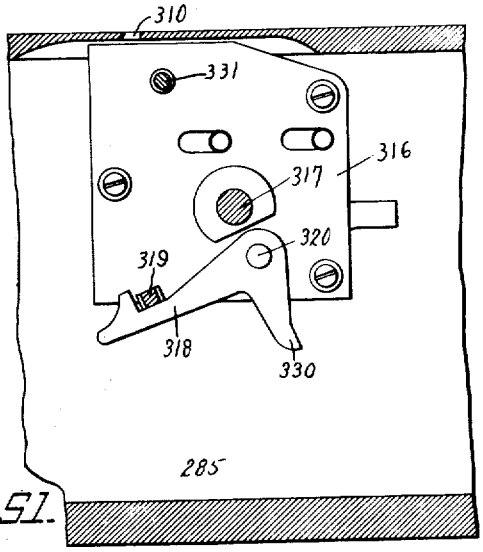
Fig. 51 is a view in section taken on the line 51—51 of Fig. 49.

The guideways 312 are carried by side plates 316 of the token receiver. The latter rotate with the arm 298, both the arm and the receiver being fixed upon a common shaft 317. However, normally, the token receiver cannot turn, being held by a latch lever 318 which engages a lug 319 fixed to a side wall 319' of the delivery box casing (see Figs. 46, 49 and 51). The door of the delivery box cannot be opened without releasing the latch 318 and the latter can be released only by inserting the right token in the slot 310.

The latch lever 318 is fixed upon a shaft 320 journaled in the side plates 316. Mounted to turn on this shaft is a lever 321 (Fig. 48) one arm of which lies in position to be engaged by a token introduced into the guideways 312. Also mounted on the shaft 320, and fixed thereto, is a lever 322, one arm of which is connected by a spring 323 to the lever 321 and is normally pressed against a stop pin 324 thereon. The other arm of the lever is forked and engages a pin 325 on a carriage 326. The carriage has pin and slot connection with walls 316 and is thus given a limited horizontal play toward and from the guideways 312. A plate 328 fitted to the carriage is formed with pins 327 adapted to enter the holes 314 in the token. Thus, when a token is inserted in the guideways, it depresses the lever 321 against the tension of a spring 329 and exerts a turning moment upon the lever 322 through spring 323, thereby pressing the pin plate 326 toward the token. If the latter is not provided with holes in register with the pins 327, only a partial sliding movement will be imparted to the carriage and the shaft 320 will not rotate far enough to disengage the latch lever 318 from the lug 319. The token, on being released, will be thrown back out of the slot by spring 329 acting through the lever 321. If, on the other hand, the token is provided with holes 314 at the proper positions, the pins 327 will enter therein and lock the token fast, at the same time permitting shaft 320 to turn far enough to release latch 318. This will permit the door 283 to be opened. When the door is opened, the token receiver will swing around to inverted position and an arm 330 of the lever will strike a pin 331 (Figs. 46 and 51) which will cause the pins 327 to withdraw from the token, allowing the latter to drop out of the guideways and into a locked receptacle 333, to which access may be had only by an authorized official. When the token receiver is inverted the token will be forcibly ejected from the guideways by the spring 329 acting through lever 321.

To prevent operating the latch lever 318 if there is no plate in the delivery box, the lever 321 (Figs. 48 and 49) is formed with an extension 335 adapted to be engaged by a hook on the end of a pivoted arm 336. A bar 337 connects this arm with one end of a bell-crank lever 338, the other end of which projects through an opening in the wall 285' into the delivery box proper and lies in the path of the plates carried by the conveyor. If a plate enters the delivery box, it will turn the lever 338 on its fulcrum, pulling the lever 336 out of engagement with the extension 335 to the position indicated in Fig. 48. When there is no plate in the box, a spring 340 acting on the lever 338, causes the arm 336 to move into position to engage the extension 335, thereby preventing the lever 321 from turning on the shaft 320 and consequently preventing the unlocking of the door 283 by the insertion of a token in the token slot 310.

Figure 52:
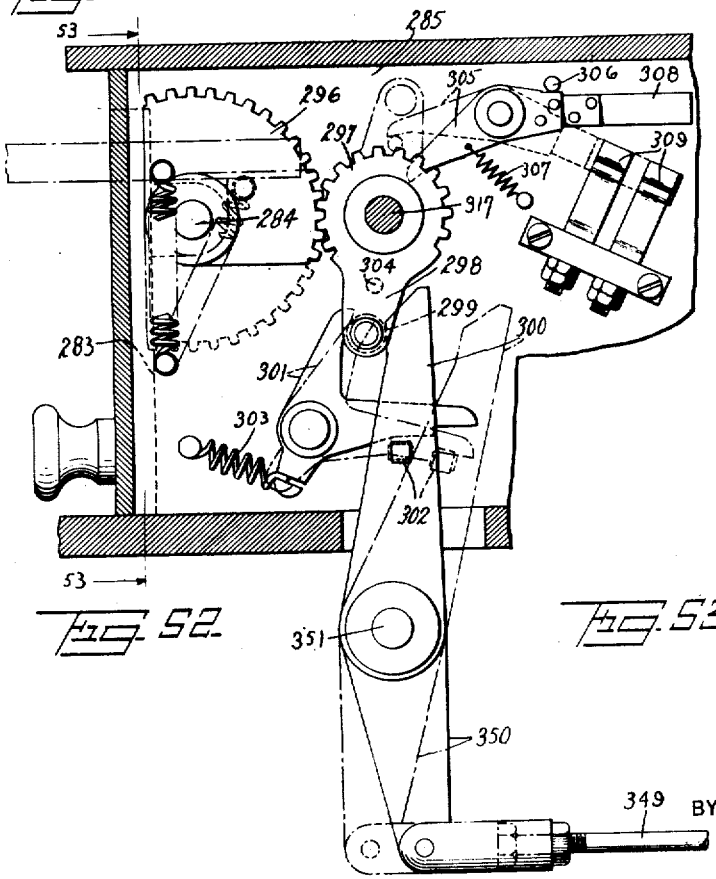
Fig. 52 is a view in section taken on the line 52—52 of Fig. 49.

To prevent withdrawal of more than one plate at each opening of the door 283, a pair of fingers 345 (Figs. 45 and 46) are provided which rise behind a plate 208 in the box and prevent succeeding plates from feeding forward until the door is closed. The fingers 345 are carried by a pair of arms 346 fixed to a transverse shaft 347 journaled below the plate 228. Secured to the shaft 347 is a crank 348 connected by a rod 349 to a crank 350 which in turn is secured to a shaft 351 on which the lever 300 is affixed (Fig. 52). Thus, when the door 283 is opened, the lever 300 is swung to the position shown by broken lines, and this motion is imparted through the mechanism just described to the fingers 345 which are thereby raised through openings 352, in the plate 228 and in the bottom of the casing 282, at each side of the belt 211 and into the path of the next succeeding plate 208. The fingers hold back all the plates except that which is in the delivery box and the latter plate is pushed out by the conveyor belt upon a shelf 353 as soon as the door 283 is opened.

When the door is closed, the roller 299 strikes the lever 301 moving it to the position shown by full lines in Fig. 52, thereby disengaging the lever from lug 302 and releasing the lever 300. Thereupon a spring 354 (Fig. 45) draws the crank 348 against a stop 355, thereby withdrawing the fingers 345 and permitting the plates 208 to move forward with the belt 211 until the foremost plate on the conveyor is arrested by engaging the door 283.

*Griddle scraper and greaser mechanism*

Referring back to Fig. 5 it will be observed that between the point T2 and the studs 121 and 121' on which the batter reservoir is supported, are several scrapers 360. Each scraper consists of a blade inclined to the plane of the griddle and secured to one arm of a bell-crank lever 361 journaled on the frame 13; a spring 362 connected to the other arm of the bell-crank lever presses the blade against the griddle. It will be observed that the blades are not set radially to the griddle, but at such an angle as to advance the scrapings centrifugally off the griddle. This angle is preferably increased with each scraper so that scrapings which might pass over one blade would be caught by the next and be given a greater centrifugal thrust.

Figure 5:
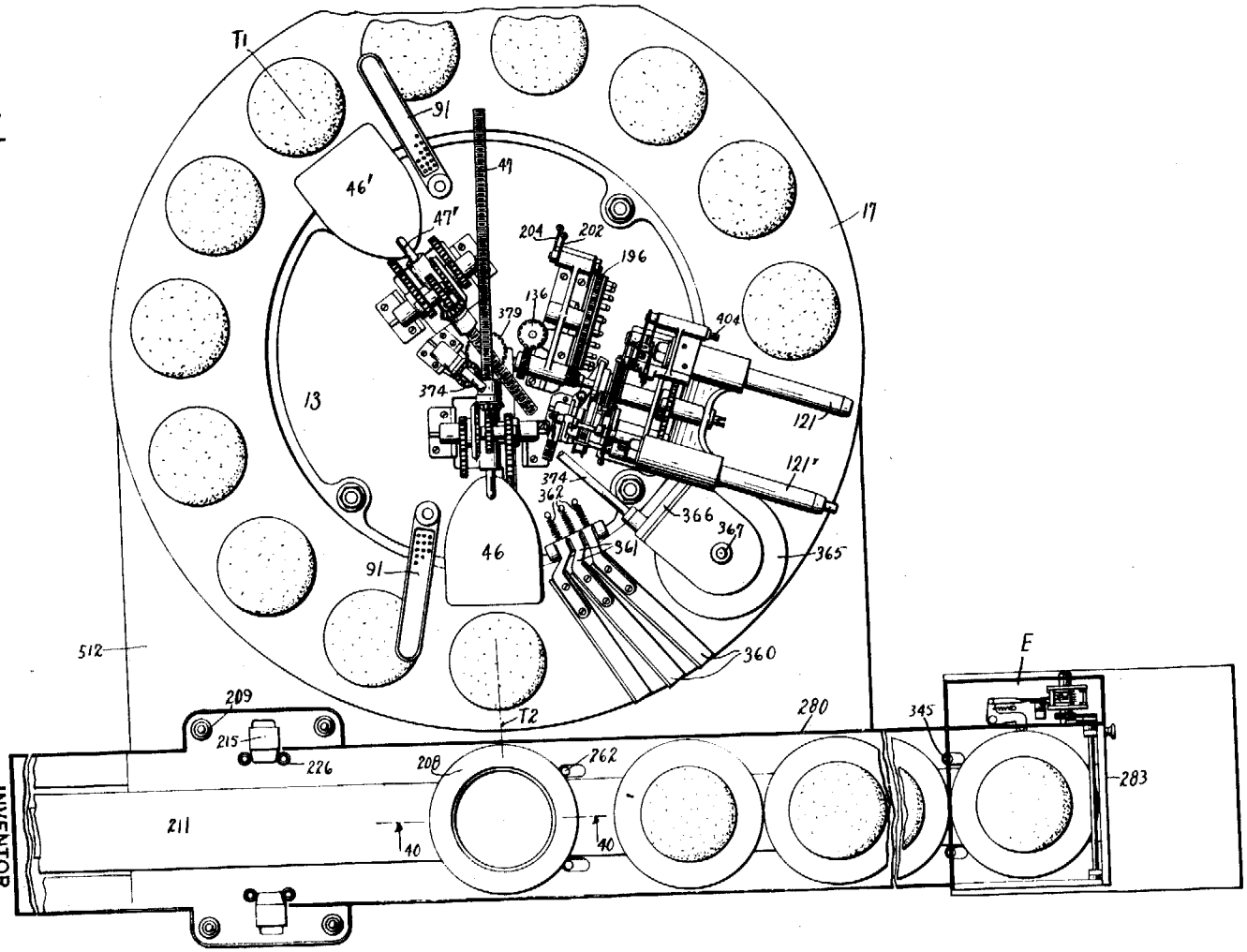
Fig. 5 is a top plan view of the machine partly broken away and with certain parts removed.
Figure 38:
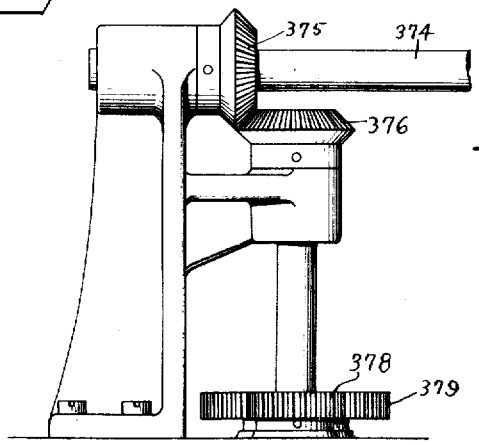
Figs. 38 and 39 are fragmentary side and plan views, respectively, of certain drive mechanism used for operating a griddle greasing device.
Figure 39:
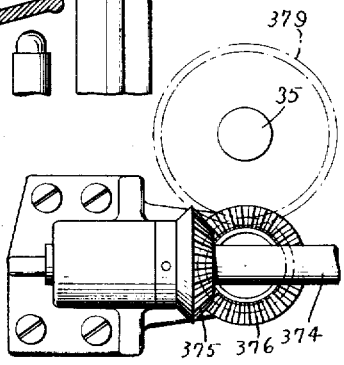
Figure 54:
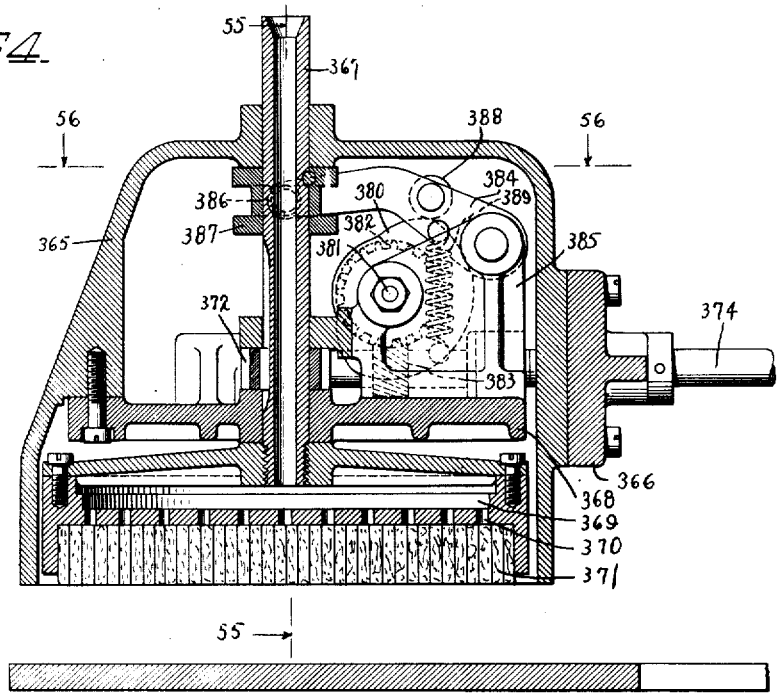
Fig. 54 is a view in vertical section of a griddle greasing device.
Figure 55:
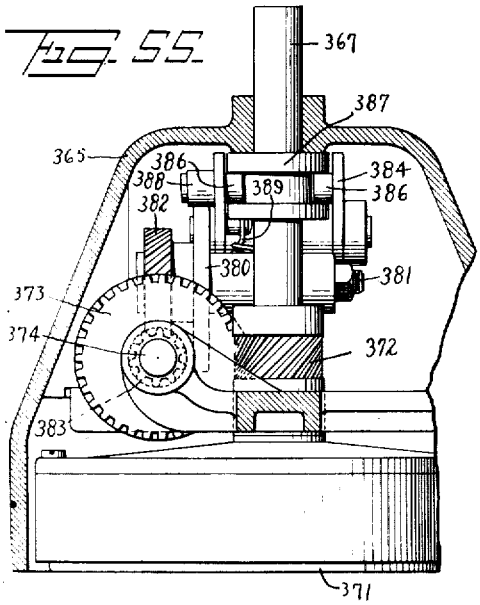
Fig. 55 is a view in section taken on the line 55—55 of Fig. 54.
Figure 56:
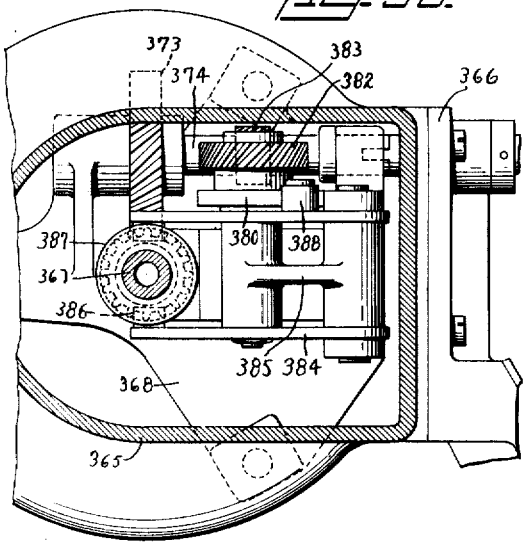
Fig. 56 is a view in horizontal section taken on the line 56—56 of Fig. 54.

Between the scrapers and the batter reservoir is a device for greasing the griddle. This is shown in detail in Figs. 54 to 56 inclusive. It comprises a casing 365, open at the bottom and supported above the griddle on a bracket 366. A hollow vertical shaft 367 is journaled in the casing and in a transverse partition 368. To the lower end of the shaft is secured a reservoir for grease 369. The reservoir is provided with a perforated bottom wall 370 through which grease passes into a pad 371 of felt or other suitable material, fastened on the bottom of the reservoir. A spiral pinion 372 is splined on the shaft 367 and meshes with a spiral gear 373 on a horizontal shaft 374. The latter is driven by the shaft 35 through a suitable train of gearing, such as shown in Figs. 5, 38 and 39, namely, a pair of miter gears 375 and 376, a driven pinion 378, and a driving gear 379 fixed on the shaft 35.

The pad 371 is kept constantly turning and during each advance of the griddle, it is lowered to grease the surface of the griddle. To this end a disc cam 380 is journaled on a stud 381 within the casing 365 and is driven by the shaft 374 through a pair of spiral gears 382 and 383. A yoke lever 384 is journaled in a bracket 385, which bracket also provides support for the stud 381, and at its outer end of the yoke lever is provided with a pair of rollers 386 which engage opposite sides of a grooved collar 387 secured to the shaft 367. Intermediate its ends the yoke lever bears a roller 388 which is held against the periphery of the cam 380 by a spring 389 tensioned between the lever 384 and the bracket 385. The cam is of such shape that at regular intervals the shaft 367 will be lowered to bring the pad into contact with the griddle to grease the surface thereof. A quantity of grease may be stored in the reservoir 369 and from time to time this may be replenished by pouring a fresh supply through the hollow shaft 367.

*Safety locking mechanism*

A number of safety devices have been provided to prevent operation of the machine when the batter reservoir is not locked in place, or when there is a shortage of batter or of plates, or when the conveyor belt has no room for further orders.

Figures 17, 18:
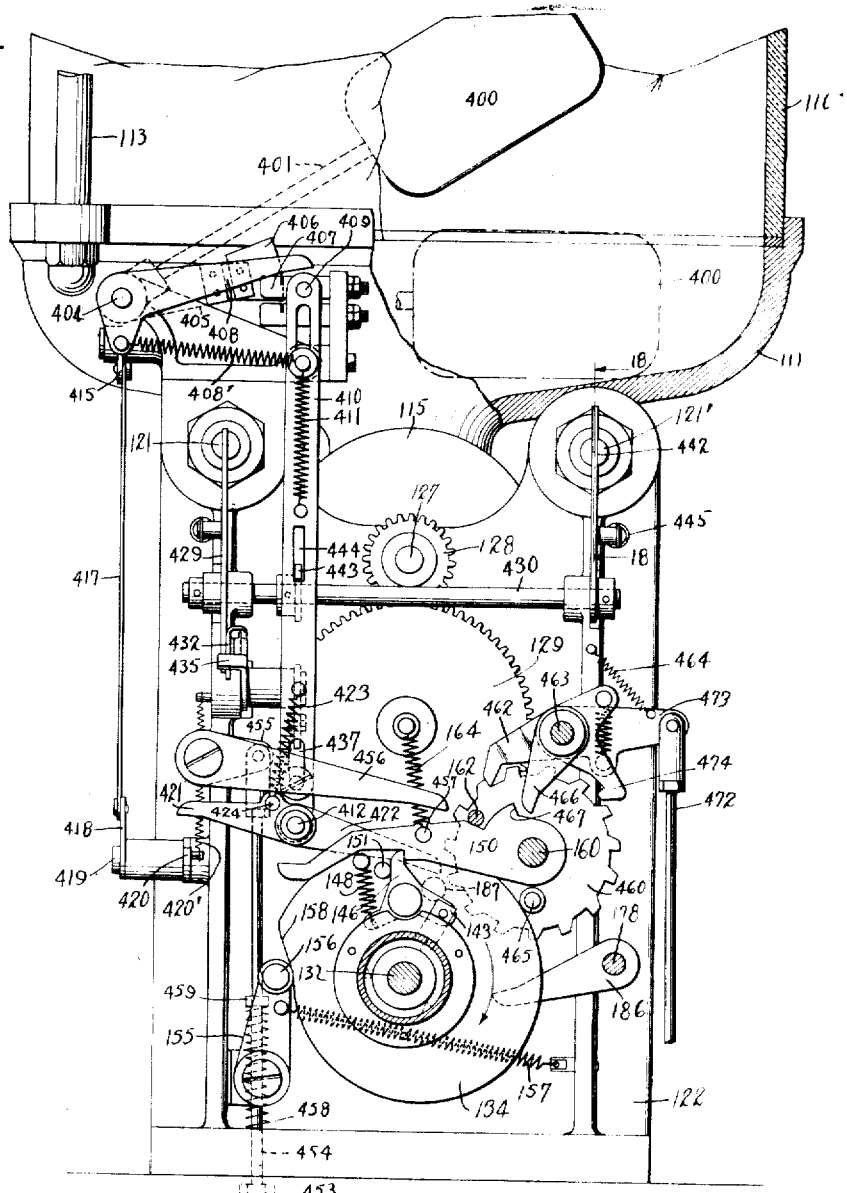
Fig. 17 is a view in vertical section taken on the line 17—17 of Fig. 14, a portion of the batter reservoir being broken away.
Fig. 18 is a view in longitudinal section of another support for the batter reservoir, the section being taken on the line 18—18 of Fig. 17.

Referring to Figs. 17 and 21, it will be observed that there is a float 400 in the batter reservoir which is secured by a rod 401 to a shaft 402. The latter passes out of the reservoir through a stuffing box 403 and is formed with a flattened end 402' (Fig. 14) adapted to engage a slot 403' in the end of an alined shaft 404, so that the shafts 402 and 404 are coupled for rotary movement, but may readily be separated when the batter reservoir is drawn off the studs 121 and 121'. The shaft 404 is journaled in the bracket 122, and secured to said shaft is an arm 405 bearing a contact blade 406 insulated therefrom which, when the float falls to the position indicated by broken lines in Fig. 17, will bridge a pair of electric contact members 407, closing a circuit to a signal, as will be described hereinafter. At the same time a lever 408, also carried by the shaft 404, strikes a pin 409 projecting from a vertical bar 410. A spring 408' normally holds the lever 408 clear of the pin. The bar 410 has a pin and slot connection with the bracket 122 whereby it is allowed a limited vertical movement. Normally, however, the bar is held in the raised position shown in Fig. 17 by a spring 411, but is lowered by the lever 408 when the float falls to a predetermined position.

The lower end of the bar 410 carries a pin 412 which projects over the free end of the arm 150 that controls the batter feed clutch. When the bar 410 is lowered, the lever 150 is engaged by the pin (as shown in Fig. 23) and is thus locked against movement so that the clutch cannot be operated and there can be no further discharge of batter until the reservoir has been refilled or, preferably, until a fresh filled reservoir has replaced the depleted one. A spring-pressed dog 413 which normally occupies the position shown in Fig. 26, engages teeth 414 on the bar 410 when the latter is depressed and locks the bar in depressed position.

When a batter reservoir is slid in place upon the studs 121 and 121' a latch arm 415 (Fig. 21) engages a lug 416 on the reservoir and locks the reservoir in place. This arm is connected by a bar 417 to a crank arm 418 (Figs. 17, 21 and 23), which is carried by a sleeve journaled on a stud 419. The sleeve also carries a crank 420 and a spring 420' holds the latch normally in raised or latching position. The crank 420 lies in the path of one arm 421 of a lever fulcrumed on the lower end of the bar 410. The other arm 422 of the lever projects adjacent the cam 134 and normally above the pin 187. A spring 423 normally holds the lever arm 421 in raised position with a stop pin 424 bearing against the bar 410. When the bar is lowered, the lever is carried downward far enough for the pin 187 to strike and raise the arm 422 (see dotted position Fig. 23) and force the arm 421 down upon the crank 420, thereby releasing the latch 415 so that the reservoir may be withdrawn and replaced with a fresh one.

When the reservoir is withdrawn, the spring 408' restores the lever 408 to normal position shown in full lines in Fig. 17, with shaft 404 in position to receive the float shaft 402 of the new reservoir. When a new reservoir is put in place on the studs 121 and 121', the bar 410 is disengaged from the dog 413 by mechanism which will be explained below, and springs up to the normal position.

Figures 15, 16:
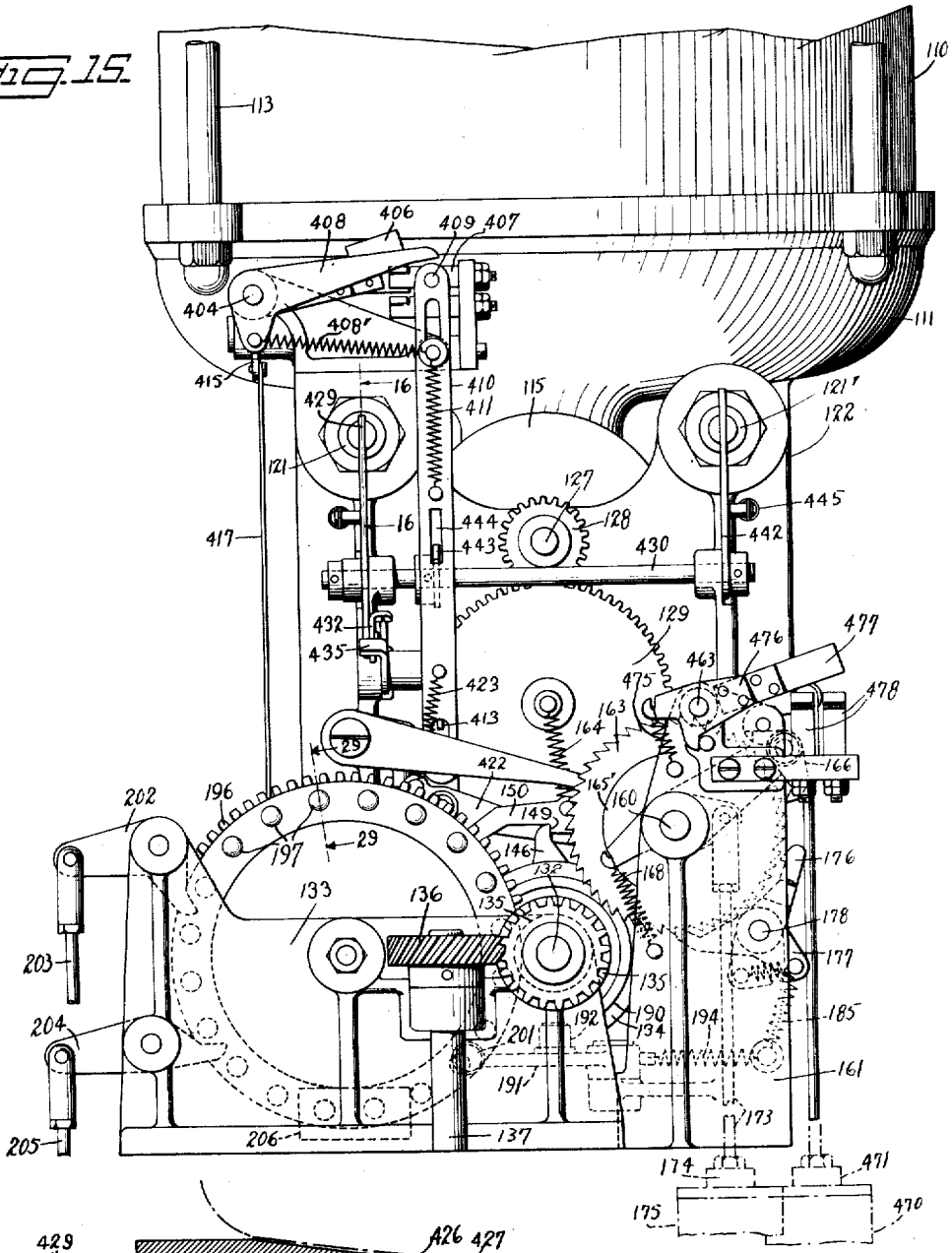
Fig. 15 is a side elevation of the same.
Fig. 16 is a view in longitudinal section through a support for the batter reservoir, the section being taken on the line 16—16 of Fig. 15.
Figure 26:
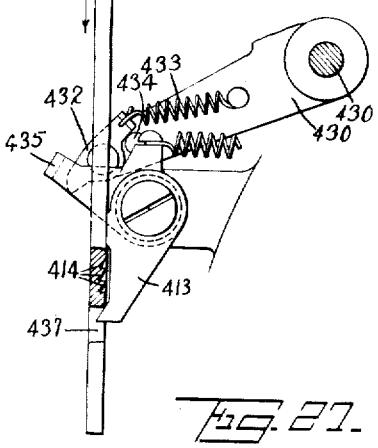
Figs. 26 and 27 are fragmentary views showing two different positions of a locking bar and associated mechanism for locking the batter reservoir in place.
Figure 24:
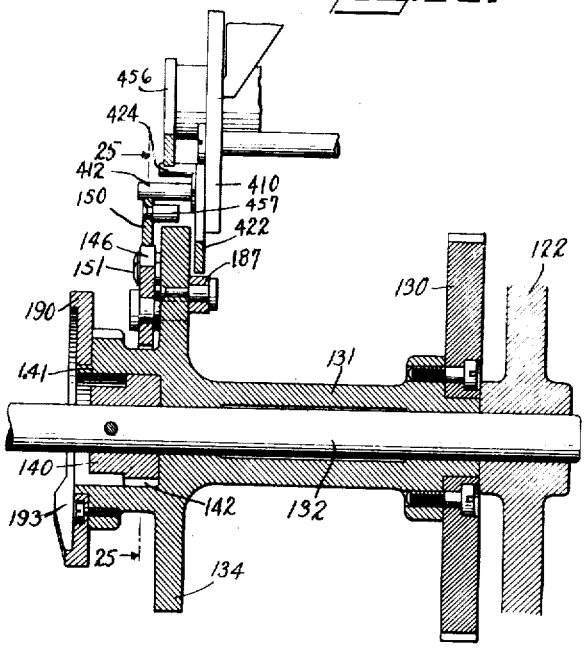
Fig. 24 is a view in section taken on the line 24—24 of Fig. 23.
Figure 27:
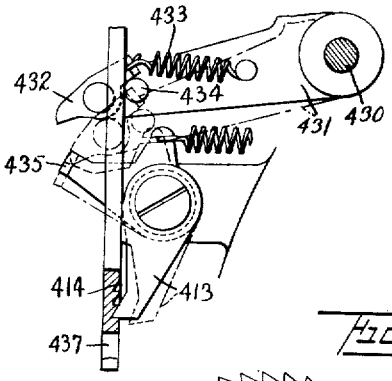

The stud 121, as shown in longitudinal section in Fig. 16, is hollow and has a stem 426 slidable therein. The stem projects from the left hand end of the stud as viewed in Fig. 16. A pin 427 carried by the stem projects through a slot in the stud in position to engage the boss 120 of the batter reservoir when the latter is slid forward into position on the studs, (see Fig. 19) thereby giving to the stem a limited axial movement. One arm of a bell-crank lever 429, freely journaled on a shaft 430, has pin and slot connection with the stem 426, while the other arm 431 has a pawl 432 pivoted thereon (Figs. 26 and 27). A spring 433 holds the pawl normally in engagement with a stop pin 434. The pawl forms virtually an extension of the arm 431 which will yield to downward pressure on the free end of the pawl, but not to upward pressure therewith against. The path of the pawl traverses the end of an arm 435 of the dog 413.

When the stem 426 is pressed outward by the boss 120, the arm 431 is swung downward and the pawl 432 strikes the arm 435 swinging the dog 413 clear of the teeth 414 and permitting the bar 410 to spring up under tension of spring 411. This withdraws the arm 421 from the crank arm 420, permitting the latter to spring upward under tension of the spring 420'. The dog 413 then enters a slot 437 below the toothed part of the bar 410, while the pawl slips past the arm 435 and the parts, to assume position shown in Fig. 26. When the reservoir is removed and the stem 426 is permitted to move inward into the stud 120, the pawl will be raised striking the arm 435 again. However, when moving in this direction the spring 433 permits the pawl 432 to yield and snap by the arm 435, so that the bar 410 which is being held down by the dog will not be released by action of the pawl 432 on removal of the batter reservoir.

Means are provided to permit of removing the batter reservoir before the batter is exhausted, but the mechanism is such that the latch which locks the batter reservoir on the machine, can be unlocked only by locking the machine against operation. To this end the stud 121' (Fig. 18) which is also hollow has a stem 440 slidable therein.

This stem is formed with a button 441 which projects from the outer end of the stud (that is the right hand end as viewed in Fig. 18), while the opposite end has a pin and slot connection with a crank arm 442 secured to the shaft 430. Also secured to the shaft 430 is an arm 443 which engages a slot 444 in the bar 410. A spring 445 holds the crank arm 442 normally in the position shown by full lines in Fig. 18. Whenever it is desired to remove the batter reservoir, the button 441 is depressed swinging the crank 442 to the broken line position and thereby depressing the bar 410. When this is done, the dog 413 catches and holds the bar in depressed position. The arm 150 is thereby locked and the latch 415 is unlocked by engagement of the arm 421 with the crank arm 420.

If the batter valve is being operated when the button 441 is depressed, the lever 421 will occupy the position indicated by full lines in Fig. 23, until it is moved to the broken line position by engagement with the pin 187 just as the clutch pin 143 is being withdrawn from engagement with member 140. Thus the latch 415 will not release the batter reservoir while the valve is in the midst of filling an order.

Figure 33:
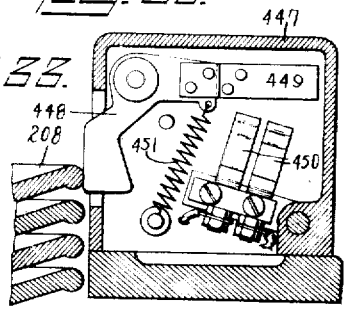
Fig. 33 is a view in section of an electrical switch controlled by the supply of plates for the machine.

Means are provided for preventing the valve from filling any further orders when the supply of plates runs dangerously low. As shown in Fig. 33, adjacent the stock of plates is a casing 447 in which is journaled a bell-crank lever 448, one arm of which projects thrcugh an aperture in the casing and bears against the stack of plates 208. Secured to but insulated from the other end of the lever, is a metal blade 449 which is adapted to bridge a pair of terminals 450 of an electric circuit.

Normally, the blade is held out of contact with the terminals by engagement with the plates 208. Just before the stack is reduced to such an extent that there are only enough plates to receive the orders on the griddle, the lever 448 is swung on its fulcrum by a spring 451, causing the blade to close the circuit across the terminals 450, thereby energizing a solenoid 452 (see Figs. 17 and 57). The solenoid attracts a plunger 453 on the lower end of a rod 454. The upper end of the rod is pivotally connected to a crank arm 455. Integral with this crank arm is a longer arm 456 which is adapted to engage a pin 457 on the lever 150 when the magnet 452 is energized, thereby preventing the arm from rising and hence preventing the batter feed valve from operating. In this way, the machine is prevented from baking further orders of cakes when there are not enough plates available to receive them. Normally, the lever is held in raised position clear of the pins 457 (as shown in Fig. 17) by a spring 458 pressing against a collar 459 on the rod 454.

Means are also provided for stopping operation of the batter valve when there is no room on the conveyor for further orders. This mechanism will now be described: On the shaft 160 is freely journaled a ratchet wheel 460 (Figs. 17 and 20). A spiral spring 461 is attached at one end to the ratchet wheel 460 and at the other to the shaft 160 and tends to rotate the ratchet wheel clockwise as viewed in Fig. 20 or in just the reverse of the direction in which the wheel 163 is urged by its spring 165. The position of the wheel 460 with respect to the flange 134 is such that a tooth of the ratchet wheel will always intersect the orbit of the pin 187. Thus, at each rotation of the flange, the pin acts as a pawl to advance the ratchet wheel counter-clockwise through an angular space equal to the spacing of the ratchet teeth. A dog or pallet 462 freely journaled on a shaft 463 serves to hold the ratchet wheel against retrograde movement. This pallet is urged into engagement with the ratchet teeth by a spring 464. Thus, the ratchet wheel will advance a step for each order filled by the batter valve mechanism until a pin 465 on the wheel engages a shoulder 467 on the lever 150 locking the latter against movement and preventing the filling of further orders by the batter valve mechanism. This occurs when there are enough orders on the griddle and the conveyor to fill the conveyor to capacity. But as each order is withdrawn from the delivery box, the wheel 460 is set back through an angle of one tooth spacing, so that if the withdrawals keep pace with the orders, the pin 465 will never reach the arm 467.

The backward feed of the ratchet wheel 460 is effected by a solenoid 470 (Figs. 15, 19 and 57) which is energized by the bridging of the terminals 309 (Fig. 52) when the delivery box door is opened. A plunger 471 controlled by this solenoid is connected by a rod 472 to an extension 473 of the pawl 462 so that at each actuation of the solenoid, the pawl 462 will be disengaged from the ratchet tooth, permitting the latter to move back under the impulse of the spiral spring 461. An escapement pallet 474 freely journaled on the shaft 463 serves to limit the retrograde movement of the ratchet wheel to one tooth spacing each time the magnet 470 is energized. The pallet 474 is resiliently connected to the pawl extension 473, as shown in Fig. 17, so that it would yield and spring over the ratchet tooth with which it was in engagement were the magnet 470 to be energized just as the pin 187 was advancing the ratchet wheel.

The pin 465, when engaging the shoulder 467, also strikes the lever 466 and the shaft 463 to which it is affixed is turned on its bearings and a contact arm 476 (Figs. 15 and 57) fixed to the shaft 463 is swung downward against the tension of a spring 475. Fixed to but insulated from the contact arm is a metal blade 477 which, when the arm is swung downward, bridges a pair of terminals 478 of an electric circuit including a lamp 479 or other device to indicate that the conveyor is overloaded. The terminals 478 are also in series with the solenoid 452 and when closed will energize the solenoid which, as previously described, will prevent the batter feed valve from operating until the terminals 478 are again opened by the withdrawal of plates from the conveyor.

Figure 57:
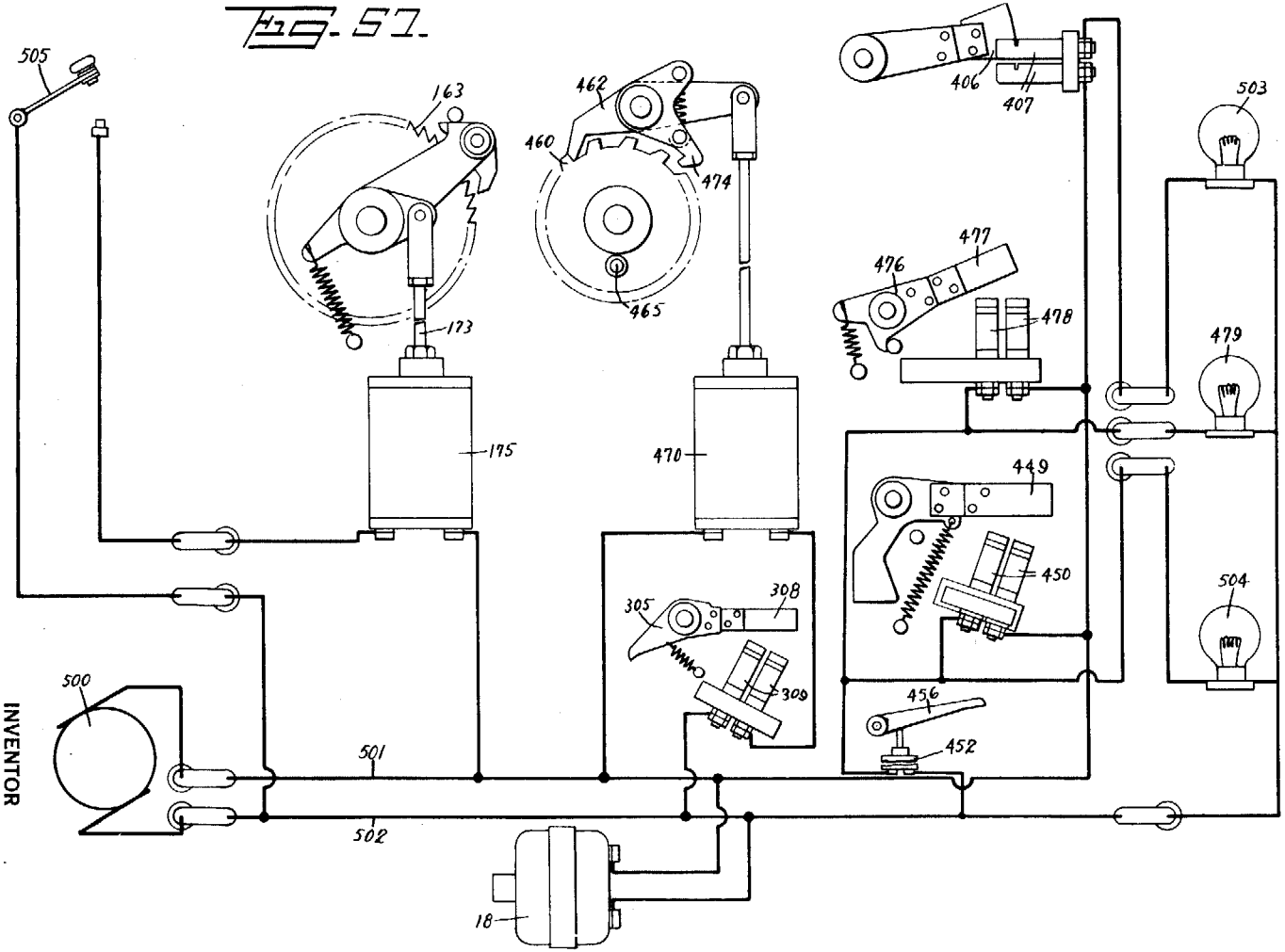
Fig. 57 is a diagram of electrical connection.

The various electrical circuits used in the machine are illustrated in Fig. 57. A pair of power lines 501 and 502 are connected to a suitable source of current such as indicated at 500. The motor 18 is bridged across these lines as are the starting solenoid 175, the token controlled solenoid 470 and the plate controlled solenoid 452. There are also three signal devices, here shown as lamps; a lamp 503 being in series with the switch terminal 407 and indicating when lighted that the batter in the reservoir has been exhausted; the lamp 479, above referred to, which is in series with the switch terminals 478 and indicates, when lighted, that orders to the full capacity of the conveyor have been received; and a lamp 504 in series with the switch terminals 450, indicating, when lighted, that the supply of plates needs to be replenished.

The solenoid 175 is connected in series with an order key 505 so that on each depression of the key the solenoid will be operated to advance the ratchet wheel 163 clock-wise, while the solenoid 470 is in series with the switch terminals 308, so that upon each opening of the delivery box to take out an order of cakes the solenoid 470 will be energized to set back the ratchet wheel 460 clockwise. The solenoid 452 is in series with the switch terminals 450 and is parallel with the lamp 504 and is also in series with the switch terminals 478. The signal lamps may be located wherever desired to attract the attention of a manager or overseer to the particular immediate needs of the machine.

The key 505 may be located at any convenient point, such, for instance, as a cashier's desk, so that when a customer (or a waiter) desires an order of cakes, the cashier will touch the key to transmit the order to the machine and at the same time will deliver a token to the customer which will identify that particular customer as one entitled to receive a plate of cakes. If desired, the machine may be used in connection with a token delivering machine, such as described in my copending application Serial No. 191,805, filed May 16, 1927, whereby the cashier, on receipt of an order, will touch a key, which will simultaneously transmit the order to the machine and utter a token, the latter however being withheld from the customer until the order has been paid for, when it is released by touching another key. Thus payment for each order is insured and at the same time delays are avoided by initiating operation of the machine without waiting for a deliberate customer to pay for the order.

In order to guard against tampering with the machine, the principal parts thereof are encased. Thus, a casing 510 covers the mechanism for operating the turners, but the griddle proper may be left exposed. A casing 511 covers the control mechanism connected with the batter feed. The conveyor as has already been explained, is enclosed in a casing 280 with a glass top 287. The casing 280, as shown in Figs. 2, 3 and 4, encloses the entire conveyor belt and wheels and joins a casing 512 which encloses the main body of the machine up to the griddle. Finally, at the point where the cakes are delivered from the griddle to the plates on the conveyor, there is a glass box 513 which is open on the griddle side and extends above the main conveyor casing 280 sufficiently to permit the turner to lift the cakes off the griddle and turn them over on the plate. The delivery box E is preferably provided with a glass sidewall as indicated at 514, Fig. 2, through which a customer may see whether there is a plate of cakes waiting for him before he inserts a token in the token receiver.

*Operation of the machine*

While the operation of my cake baking machine has been explained in connection with the detailed description of various parts given above, the following resume may be found useful as giving a comprehensive picture of the operation of the machine.

When the key 505 is depressed, the solenoid 175 is operated to advance the ratchet wheel 163 clockwise, withdrawing the pin 162 (Fig. 17) from the arm 150. The latter is raised by spring 164 permitting the spring 148 to throw the batter feed clutch, coupling the sleeve 131 to the continuously rotating shaft 132 (Fig. 31). The sleeve in making a complete turn sets the ratchet wheel 163 back by engagement of pin 187 with arm 186, the latter operating an escapement which permits the ratchet wheel 163 to return under impulse of spiral spring 165 (Fig. 20). Unless the orders are coming in faster than they are being filled, the arm 150 will be returned by the pin 162 to position to engage the lever 146 and throw out the batter feed clutch by the time the sleeve has made a complete rotation. If, however, one or more orders are received while the sleeve is turning, the arm 150 will not be restored to declutching position until the orders have all been filled.

One turn of the sleeve 133 will result in three turns of the batter valve 116, so that three batches of batter will be measured out from the reservoir and deposited on the griddle for each order. The griddle is moved intermittently regardless of the order received, but the batter feed clutch is so timed with respect to the feed of the griddle that each deposit of batter will take place during a pause in the motion of the griddle. The shaft 132 rotates at one third the speed of the mutilated pinion 27 (Fig. 6) which drives the griddle. As shown in Fig. 25, there are three notches, 142, in the clutch member 140 and the notches reach the declutching position successively in synchronism with the step by step movement of the griddle. Thus, the operation of the batter valve is timed to the travel of the griddle.

The griddle is maintained at such a temperature that as each deposit of the batter reaches the point T1, it will be thoroughly baked on one side. At this point, the turner blade 46′ is tilted downward into contact with the griddle, as shown in full lines on Fig. 8, and is then moved forward to peel the cake off the griddle, after which the blade is tilted up and turned over, as indicated by broken lines, depositing the cake, raw side downward on the griddle. All this takes place during a pause in the travel of the griddle. While the griddle is taking a forward step the greaser pad 92 is lifted off the pad 90 by action of roller 103 on the button 104 (Fig. 13) and the pads are swung laterally and then returned in contact with the blade 46 by action of the cam lever 98, thus greasing the blade.

In the meantime, the cakes progress successively step by step to the point T2 and as they reach this point they are thoroughly baked. As each cake arrives, it is lifted off the griddle by the turner blade 46 which goes through the same movements as the blade 46′ except that before turning the cake it carries the cake clear of the griddle and into the casing 513 (Fig. 1). In this casing, there is a plate 208 on which the cake is deposited. The turner blade 46 is greased after delivering each cake, in the same manner as is the blade 46′. Between the point T2 and the batter reservoir, the scrapers 360 scrape the griddle clean, and the griddle is greased by the rotating pad 371 (Fig. 54) which is brought into contact with the griddle at each pause of the latter, by action of cam 385.

A plate is moved into the casing 513 in position to receive the cakes by a plate supplying mechanism and synchronizing of this mechanism with the batter feed is effected by means of the cam lever 191 (Fig. 15) which, at each turn of the sleeve 131, projects a pin through the wheel 196. The wheel turns continuously, but at such a rate with respect to the griddle that for each step of the latter the wheel moves through an angle corresponding to that of the pin spacing. The pin projected by the lever 91 impinges upon the lever 202 just before the first cake of the order reaches the point T2. Operation of the lever 202 raises the detent 238 (Fig. 42) permitting the spring 237 to throw the clutch which couples the plate supply mechanism to the driven pinion 233. Said mechanism picks a plate off the bottom of the stack of plates in the manner indicated by the successive views in Figs. 34 to 37 and deposits it on the conveyor belt 211 which is constantly running. The latter carries the plate into the casing 513 where it is stopped by fingers 262 (Fig. 40) just in time to receive the first cake of the order it was destined to carry. Here the plate remains, while the belt slips under it, until the projected pin 197 reaches the lever 204 (Fig. 15). This will occur on the third step of the griddle after lever 202 is actuated because, as shown in the drawings, lever 204 is located at an angle of three pin spacings from lever 202. The lever 204 withdraws the detent 267 (Fig. 42) permitting spring 263 to depress fingers 262, so that the plate may proceed with the conveyor or belt on to the delivery box E (Fig. 1).

Each plate as it enters the delivery box, pushes the lever 338 (Fig. 49) withdrawing the latch arm 346 from engagement with the extension 335 of lever 321, and thus preparing the token receiver for operation by token.

On inserting the proper token in slot 326 (Fig. 49), the door 283 (Fig. 46), of the delivery box, will be unlatched and may be swung open, thereby inserting the token receiver and dropping the token into the box 333 (Fig. 48). As the door 283 is opened, arm 304 is swung from the full line position shown in Fig. 52 to the broken line position, and in so doing swings the lever 300 to the broken line position, thereby raising the fingers 345 (Fig. 45) to prevent a succeeding plate from being carried forward while the plate in the delivery box is being removed. At each opening of the door 283, contact lever 305 is actuated to close the circuit of the solenoid 470, operating the escapement which permits wheel 460 (Fig. 17) to turn clockwise under impulse of spring 461 (Fig. 20) through an angle of one tooth spacing. Thus the wheel 460 which is advanced clockwise at each order by pin 187 engaging and driving wheel 460, is set back an equal amount at each withdrawal of cakes from the delivery box. When the withdrawals fall so far behind the orders that the capacity of the conveyor is threatened, the pin 465 strikes the arm 466 interrupting operation of the batter feed until the withdrawals can catch up, and at the same time closing the circuit to lamp 475 to notify the manager of the congestion.

I have described my invention as adapted for baking griddle cakes but obviously other forms of food could be baked on the machine. Furthermore, my invention is not confined to the specific embodiment described above, but I reserve the right to make such changes, alterations and modifications of construction or arrangements of parts as may be desired or as may be necessary to adapt the invention to other uses, without departing from the spirit and scope of the invention as defined in the appended claims.

Having thus described my invention, what I claim and desire to protect by Letters Patent is:

1. A batter cake preparing and delivering machine, including a cooking device, a batter delivering element associated therewith, a cake turner for turning over a cake, a cake handler for subsequently removing the cake from said cooking device, and wiping and greasing devices associated with and acting on said cake turner and said cake handler.

2. A batter cake preparing and delivering machine, including a griddle, scraping and greasing devices acting thereon, a batter delivering element associated with said griddle, and means for removing cooked batter cakes therefrom.

3. A batter cake preparing and delivery machine, including a griddle, a batter container having means for depositing batter on said griddle, means for removing batter cakes from said griddle, mechanism for presenting a plate adjacent said griddle to receive a predetermined number of batter cakes from said handling device, said mechanism being called into action by operation of said batter depositing means.

4. A batter cake preparing and delivery machine, including a griddle, a batter container having means for depositing batter on said griddle, means for removing batter cakes from said griddle, a plate conveyor for moving a series of plates past said griddle in position to receive batter cakes from said cake removing means, stop means for arresting movement of plates adjacent said griddle, and batter control mechanism associated with said plate conveyor and called into action when enough cakes are on the griddle to complete the filling of said plate conveyor to arrest operation of said batter depositing means.

5. A batter cake preparing and delivery machine, including a griddle, means for supplying batter thereto, a cake remover cooperating with said griddle, and plate handling mechanism cooperating with said cake removed for bringing a plate into cake receiving position and maintaining it there for a time sufficient for the deposit thereon of a predetermined number of griddle cakes from said cake remover.

6. A batter cake preparing and delivery machine, including a griddle, means for supplying batter thereto, a cake remover cooperating with said griddle, and plate handling mechanism cooperating with said cake remover for holding a plate in position to receive a predetermined number of batter cakes from said cake remover, and operable thereupon to convey such plate to a predetermined point.

7. In a food handling machine including mechanism for preparing a plurality of orders of food, a controlling device for said machine, and means for transmitting to the controlling device, faster than said mechanism can prepare the orders, a number of actuating impulses determined by the number of orders to be prepared, said controlling device receiving said impulses as rapidly as they are sent and adapted to be set thereby in accordance with the number of impulses received to permit the machine to prepare a number of orders determined by the number of impulses received.

8. A batter cake machine including a griddle, a cake turner associated therewith, actuating mechanism therefor for causing said cake turner to turn over a batter cake carried by said griddle, and a turner wiping and greasing device cooperating with said cake turner.

9. A batter cake preparing and delivering machine, including a griddle, a batter container having means for depositing batter on said griddle, a cake handling device for removing batter cakes from said griddle, a plate supply, plate handling mechanism for moving a plate from said supply to a point adjacent said griddle to receive a predetermined number of batter cakes from said cake handling device, and batter control mechanism associated with said plate handling mechanism and called into action when said plate supply reaches a predetermined minimum number for preventing further operation of said batter depositing means.

10. A batter cake preparing and delivering machine, including a griddle, a removable batter container having means for depositing batter on said griddle, and a locking device cooperating with said batter depositing means and said batter container for preventing removal of said batter container during operation of said batter depositing means.

11. In a food handling machine, mechanism for preparing a plurality of orders of food, each order comprising a plurality of articles, means for restraining actuation of said mechanism, a controlling device for said machine, and means for transmitting to the controlling device, faster than said mechanism can prepare the orders, a number of impulses determined by the number of orders to be prepared, said controlling device receiving said impulses as rapidly as they are sent and adapted to be set thereby in accordance with the number of impulses received to release said restraining means and thereby permit the machine to prepare a number of orders determined by the number of impulses received.

12. In combination, a griddle, means for heating the same, propelling means adapted to rotate the griddle with a step by step motion, a reservoir for material to be cooked, a valve in the reservoir for depositing material therefrom upon the griddle, means operable by the propelling means for actuating the valve between steps in the rotation of the griddle, clutch means for operatively connecting the valve actuating means and the propelling mechanism at will, and means for automatically disengaging the clutch means after a predetermined number of operations of the valve actuating means.

13. In combination, a griddle, means for heating the same, a reservoir for raw material, means for moving the griddle with respect to the reservoir, a measuring valve for depositing measured quantities of said material on the griddle, means for operating the valve, means for preventing operation of the valve when the material in the reservoir falls below a predetermined quantity, a signal, and means for operating the signal when the material in the reservoir nears exhaustion.

14. In combination, a griddle, means for heating the same, a reservoir for raw material, means for moving the griddle with respect to the reservoir, a measuring valve in the reservoir for depositing measured quantities of said material on the griddle, means for operating the valve, a signal, and float controlled means for actuating the signal and for preventing operation of the valve when material in the reservoir falls below a predetermined level.

15. In combination, a griddle, means for heating the griddle, a reservoir for raw material, a mounting for the reservoir, a latch for locking the reservoir on the mounting, a valve in the reservoir for depositing quantities of said material on the griddle, means for operating the valve, and means for preventing operation of the valve unless the reservoir is locked on said mounting.

16. In combination, a griddle, means for heating the griddle, a reservoir for raw material, a mounting for the reservoir, a latch for locking the reservoir on the mounting, a valve in the reservoir for depositing measured quantities of said material on the griddle, means for operating the valve, and means for automatically unlocking the latch when material in the reservoir falls below a predetermined level.

17. In combination, a griddle, means for heating the griddle, a reservoir for raw material, a mounting for the reservoir, a latch for locking the reservoir on the mounting, a valve in the reservoir for depositing measured quantities of said material on the griddle, means for operating the valve, means for automatically unlocking the latch when material in the reservoir falls below a predetermined level, and auxiliary means for unlocking the latch at will.

18. In combination, a griddle, a heater therefor propelling means for rotating the griddle, a griddle greasing means, a reservoir for raw material, a valve for depositing material from the reservoir upon the griddle, means operating in timed relation to the rotation of the griddle for actuating the greasing means, and means for actuating the valve.

19. In combination, a griddle, a heater therefor, propelling means for rotating the griddle, a griddle greasing means, a reservoir for raw material, a valve for depositing material from the reservoir upon the griddle, means operating in timed relation to the rotation of the griddle for actuating the greasing means, means for actuating the valve, and means for cleaning the griddle.

20. In combination, a griddle, a heater therefor, propelling means for rotating the griddle, a griddle greasing pad, means for rotating the same, a reservoir for raw material, a valve for depositing material from the reservoir upon the griddle, means operating in timed relation to the rotation of the griddle for periodically moving the pad into engagement with the griddle, and means for actuating the valve.

21. In combination, a griddle, a heater therefor, propelling means for rotating the griddle with a step by step movement, a griddle greasing pad, means for rotating the same, a reservoir for raw material, a valve for depositing material from the reservoir upon the griddle, means for moving the pad into engagement with the griddle during each step of the intermittent rotation of the griddle, means for actuating the valve, the valve actuating means being timed to operate only during a pause in the rotation of the griddle.

22. In combination, a rotary griddle, a heater therefor, a reservoir, a valve therein, means for operating the valve to deposit material from the reservoir upon the griddle, means for rotating the griddle at a predetermined rate to carry the material through an orbit, a griddle turner for inverting the material at a predetermined point in said orbit, and means for removing the inverted material from the griddle at a subsequent point in the orbit thereof and for turning the material through an angle of substantially 180 degrees after removal thereof from the griddle.

23. In combination, a rotary griddle, a heater therefor, a reservoir, a valve therein, means for operating the valve to deposit material from the reservoir upon the griddle, means for rotating the griddle at a predetermined rate to carry the material through an orbit, a griddle turner for inverting the material at a predetermined point in said orbit, means for greasing said turner, and means for removing the inverted material from the griddle at a subsequent point in the orbit thereof and for turning the material through an angle of substantially 180 degrees after removal thereof from the griddle.

24. In a griddle cake baking machine, a rotatable griddle, means for heating the same, means for depositing batter at one point on the griddle, a turner blade at another point on the griddle, means for rotating the griddle intermittently to carry the deposited batter to the turner blade, means operating in timed relation to the rotation of the griddle for advancing the blade relative to and in contact with the griddle during a pause in the intermittent motion thereof to peel a cake off the griddle, and means for rotating the blade to invert the cake and redeposit it on the griddle.

25. In a griddle cake baking machine, a rotatable griddle, means for heating the same, means for depositing batter at one point on the griddle, a turner blade at another point on the griddle, means for rotating the griddle intermittently to carry the deposited batter to the turner blade, means operating in timed relation to the rotation of the griddle for actuating the blade to turn the partly cooked batter on the griddle, and means operating in timed relation to the blade operating means for greasing the blade.

26. In a griddle cake baking machine, a rotatable griddle, means for heating the same, means for depositing batter at one point on the griddle, a turner blade at another point on the griddle, means for rotating the griddle intermittently to carry the deposited batter to the turner blade, means operating in timed relation to the rotation of the griddle for actuating the blade to turn the partly cooked batter on the griddle, a pair of greasing pads, and means operating in timed relation to the blade operating means for causing a relative movement of the pads across and in contact with the blade.

27. In a machine of the character described, a rotatable griddle, a heater for heating the same, a batter reservoir, a valve therein for depositing batter at one point on the griddle, a turner blade at a subsequent point on the griddle, a second turner blade at a second subsequent point on the griddle, means adapted to advance each blade with its forward edge pressed into contact with the griddle and thereafter to raise the forward edge of the blade, said means operating to move the second blade clear of the griddle, means for thereafter turning each blade through an angle of substantially 180 degrees, and means for rotating the griddle intermittently, the means for advancing and turning the blades being timed to operate during each pause in the intermittent rotation of the griddle.

28. In a machine of the character described, a rotatable griddle, a heater therefor, a batter reservoir, a valve therein for depositing batter at one point on the griddle, a turner blade at a subsequent point on the griddle, means for actuating the blade, means for greasing the blade, and means for rotating the griddle intermittently, the means for actuating and for greasing the blade being timed to operate during the intermittent motion of the griddle.

29. In a machine of the character described, a rotatable griddle, a heater therefor, a batter reservoir, a valve therein for depositing batter at one point on the griddle, a turner blade at a subsequent point on the griddle, a second turner blade at a second subsequent point on the griddle, means for actuating the blades, means for greasing each blade, means for rotating the griddle intermittently, the means for actuating and for greasing the blades being timed to operate during the intermittent motion of the griddle, and means for cleaning the griddle in advance of the batter depositing point.

30. In a machine of the character described, a rotatable griddle, a heater therefor, a batter reservoir, a valve therein for depositing batter at one point on the griddle, a turner blade at a subsequent point on the griddle, a second turner blade at a second subsequent point on the griddle, means for actuating said blades, means for greasing each blade, means for greasing the griddle, and means for rotating the griddle intermittently, said means for actuating and greasing the blades and for greasing the griddle being timed to operate during the intermittent motion of the griddle.

31. In a machine of the character described, a rotatable griddle, means for depositing cake batter on the griddle, means for heating the griddle to bake the batter, means for rotating the griddle at a predetermined rate, and means at a predetermined point with respect to the batter depositing means for peeling the baked cake off the griddle, advancing it clear of the griddle and turning it over.

32. In a machine of the character described, a rotatable griddle, means for heating the same, means for rotating the griddle, means for depositing cake batter on the griddle at one point, means at another point on the griddle for removing the baked cakes therefrom, a conveyor for plates, a stop for arresting a plate on the conveyor in position to receive cakes removed from the griddle, means for releasing the plate after a predetermined number of cakes have been placed thereon, and a delivery box into which the plate of cakes is carried by the conveyor.

33. In a machine of the character described, a griddle, means for depositing cake batter on the griddle, means for moving the griddle to carry deposited batter toward a transfer point, means for heating the griddle to bake the batter as it is carried toward said point, a plate supply, means operated in timed relation to the batter depositing means for conveying a plate from said plate supply to said transfer point, and means at said transfer point for transferring cakes from the griddle to the plate.

34. In a machine of the character described, a rotatable griddle for heating the same, means for rotating the griddle intermittently, means for intermittently depositing cake batter on the griddle at one point, means at another point on the griddle for removing the baked cakes therefrom, a conveyor for plates, a stop for arresting a plate on the conveyor in position to receive cakes removed from the griddle, means for releasing the plate after a predetermined number of cakes have been placed thereon, and a delivery box into which the plate of cakes is carried by the conveyor.

35. In a machine of the character described, a rotatable griddle, means for heating the same, means for depositing cake batter on the griddle, means for moving the griddle to carry the deposited batter toward a transfer point, a stack of plates, means operated in timed relation to the batter depositing means for conveying a plate from said stack to said transfer point, means at said point for transferring cakes from the griddle to the plate, and means controlled by said stack of plates for preventing operation of the batter depositing means when the number of plates in the stack falls below a predetermined minimum.

36. In a machine of the character described, a rotatable griddle, means for heating the same, means for depositing cake batter on the griddle, means for moving the griddle to carry the deposited batter toward a transfer point, a stack of plates, means operated in timed relation to the batter depositing means for conveying a plate from said stack to said transfer point, means at said point for transferring cakes from the griddle to the plate, a signal, and means controlled by said stack of plates for operating the signal and preventing operation of the batter depositing means when the number of plates in the stack falls below a predetermined minimum.

37. In a food handling machine, means for transmitting to the machine a plurality of actuating impulses, means for restraining actuation of said machine, and a controlling device for receiving said impulses and adapted to be set thereby in accordance with the number of impulses received to release said restraining means and thereby permit said machine to operate a number of times determined by the number of impulses received.

38. In a food handling machine, means for transmitting to the machine at will a plurality of actuating impulses, means for restraining actuation of said machine, and a controlling device for receiving said impulses and adapted to be set thereby in accordance with the number of impulses received to release said restraining means and thereby permit said machine to operate a number of times determined by the number of impulses received.

39. In combination, an intermittently rotated griddle, means for depositing food thereupon, a heater for the griddle to bake the food, a blade, and means for operating the blade in timed relation to the griddle and the depositing means to effect first a relative scraping movement of the blade and griddle so as to peel the food off the griddle and thereafter a turning movement of the blade to redeposit the food upon the griddle.

40. In combination, a griddle, means for depositing food thereon, a heater for the griddle to bake the food, a turning blade, means operating in timed relation to the depositing means for first effecting a relative scraping movement of the blade and griddle to peel the food off the griddle, and for then turning the blade to redeposit the food on the griddle, a removing blade, and means for operating the latter in timed relation to the operation of said turning blade for removing the redeposited food from the griddle.

41. In combination, a rotary griddle, a heater therefor, a reservoir, a valve in said reservoir, means for operating the valve to deposit material from the reservoir upon the griddle, means for rotating the griddle at a predetermined rate to carry the material through an orbit, a peel cooperating scrapingly with the griddle for inverting the material on said griddle at a predetermined point in said orbit, and a second peel cooperating scrapingly with said griddle for removing therefrom material inverted thereon by the first-mentioned peel.

42. In combination, a rotary griddle, a heater therefor, means for rotating the griddle at a predetermined rate to carry through an orbit material deposited thereon, a peel cooperating scrapingly with the griddle for inverting said material on said griddle at a predetermined point in said orbit, and a second peel cooperating scrapingly with said griddle for removing therefrom material inverted thereon by the first-mentioned peel.

43. In combination, a griddle, means for heating the same, propelling means for rotating the griddle, a reservoir associated with said griddle, a reservoir valve, valve actuating mechanism called repeatedly into action by operation of said propelling means for causing repeated deposits on said griddle of material from said reservoir, a peel associated with said griddle and having turning mechanism operated by said propelling means for inverting on said griddle material deposited thereon from said reservoir, and means for removing from said griddle material inverted thereon by said peel comprising a second peel associated with said griddle and having actuating mechanism operated by said propelling means.

44. A griddle cake machine including, in combination, heating means, a griddle associated therewith, a batter reservoir associated with said griddle, means for moving said griddle with respect to said reservoir, a reservoir valve, valve actuating mechanism called repeatedly into action by operation of said griddle moving means for causing repeated deposits on said griddle of batter from said reservoir, means for inverting on said griddle material deposited thereon from said reservoir, said means comprising a first peel associated with said griddle and having turning mechanism operating in timed relation to said valve actuating mechanism, and means for subsequently removing the inverted material from said griddle comprising a second peel associated with said griddle and having actuating mechanism operating in timed relation to said turning mechanism for moving said second peel in a direction substantially parallel to the griddle surface and toward an edge thereof.

45. In a machine of the class described, a horizontally maintained griddle having a substantially plane upper surface, and rotatable about an axis perpendicular to said surface, means for heating the griddle, actuating means including means to give movement to the griddle, a batter container cooperatively positioned relative to the griddle and in a fixed position relative to said axis, means operatively associated with the container and actuated in timed relation with the movement of the griddle for intermittently depositing unformed portions of the batter in spaced relations upon the said surface, means associated with the griddle for successively peeling therefrom each of the deposited portions and for replacing the peeled portions in inverted position thereon, and means for removing from the griddle thereafter the replaced portions.

46. A batter-cake producing machine including a movable griddle, actuating means including means to cause movement of the griddle, a batter-container and means associated therewith to deposit portions of the batter in spaced relations upon the griddle, means to transmit heat to the griddle to process the batter-portions, releasable means to cause the batter-depositing means to deliver a predetermined number of batter-portions to the griddle and in timed relations to the movement thereof, means adapted to invert the batter-portions during the processing thereof and means for subsequently removing the processed batter-portions from the griddle, a controlling device for said machine adapted to receive order-impulses representing the predetermined number of batter-portions and to accumulatively and deletively register said impulses, means actuated by the controlling device to release the said releasable means, means to delete the registered impulses, and means to receive and effect delivery of the processed batter-portions represented thereby.

47. In a machine of the character described, a rotatable griddle, means for depositing cake batter on the griddle, means for heating the griddle to bake the batter, and means for rotating the griddle at a predetermined rate and means at a predetermined point with respect to the batter deposited, means for peeling the baked cake off the griddle and advancing it clear of the griddle.

HARRY RUSSELL BRAND.